US012806864B2

(12) United States Patent
Reeves-Hall

(10) Patent No.: US 12,806,864 B2
(45) Date of Patent: Nov. 24, 2026

(54) LOAD BALANCING AND POWER MANAGEMENT FOR ADDITIVE MANUFACTURING SYSTEMS AND PROCESSES

(71) Applicant: VulcanForms Inc., Devens, MA (US)

(72) Inventor: Peter Colin Reeves-Hall, Whitinsville, MA (US)

(73) Assignee: VulcanForms Inc., Devens, MA (US)

( * ) Notice: Subject to any disclaimer, the term of this patent is extended or adjusted under 35 U.S.C. 154(b) by 372 days.

(21) Appl. No.: 18/524,325

(22) Filed: Nov. 30, 2023

(65) Prior Publication Data

US 2024/0181715 A1 Jun. 6, 2024

Related U.S. Application Data

(60) Provisional application No. 63/429,236, filed on Dec. 1, 2022.

(51) Int. Cl.
*B29C 64/393* (2017.01)
*B29C 64/153* (2017.01)
(Continued)

(52) U.S. Cl.
CPC .......... *B29C 64/393* (2017.08); *B29C 64/153* (2017.08); *B29C 64/268* (2017.08); *B33Y 50/02* (2014.12)

(58) Field of Classification Search
None
See application file for complete search history.

(56) References Cited

U.S. PATENT DOCUMENTS

| | | | |
|---|---|---|---|
| 9,956,612 | B1 | 5/2018 | Redding et al. |
| 10,022,795 | B1 | 7/2018 | Redding et al. |

(Continued)

FOREIGN PATENT DOCUMENTS

| | | | |
|---|---|---|---|
| CN | 113442442 B | 5/2022 | |
| DE | 10 2020 200 599 A1 | 7/2021 | |

(Continued)

OTHER PUBLICATIONS

Wan, Jiafu, et al. "Fog computing for energy-aware load balancing and scheduling in smart factory." IEEE Transactions on Industrial Informatics 14.10 (2018): 4548-4556. (Year: 2018).*

(Continued)

*Primary Examiner* — Carlos R Ortiz Rodriguez
(74) *Attorney, Agent, or Firm* — Wolf, Greenfield & Sacks, P.C.

(57) ABSTRACT

Additive manufacturing systems and related methods directed to load balancing and power optimization for one or more additive manufacturing systems are disclosed. In some embodiments this may include load balancing and power optimization of a plurality of simultaneously running additive manufacturing processes. In some embodiments, one or more additive manufacturing systems may utilize coordinated timing of energy sources, such as laser energy sources, to reduce a maximum combined power during operation of these systems. In other embodiments, the orientations of parts being manufactured may be selected to reduce a maximum energy consumption per layer and/or a variation of energy consumption between layers during additive manufacturing of the parts. The disclosed part orientation and system timing coordination may either be used individually or in combination with one another.

30 Claims, 15 Drawing Sheets

(51) Int. Cl.
*B29C 64/268* (2017.01)
*B33Y 50/02* (2015.01)

(56) References Cited

U.S. PATENT DOCUMENTS

| | | | |
|---|---|---|---|
| 10,336,008 B2 | 7/2019 | Perret et al. | |
| 2004/0006438 A1 | 1/2004 | Hastert et al. | |
| 2016/0158889 A1 | 6/2016 | Carter et al. | |
| 2016/0368050 A1 | 12/2016 | Morris et al. | |
| 2017/0021455 A1 | 1/2017 | Dallarosa et al. | |
| 2017/0056975 A1 | 3/2017 | Carter et al. | |
| 2018/0200792 A1 | 7/2018 | Redding et al. | |
| 2018/0207722 A1 | 7/2018 | Feldmann et al. | |
| 2018/0236549 A1 | 8/2018 | Spears et al. | |
| 2019/0049929 A1* | 2/2019 | Good | B23K 26/342 |
| 2019/0143406 A1 | 5/2019 | Carter et al. | |
| 2019/0299286 A1 | 10/2019 | Feldmann et al. | |
| 2020/0038953 A1 | 2/2020 | Pavan et al. | |
| 2020/0039000 A1 | 2/2020 | Sweetland | |
| 2020/0061917 A1 | 2/2020 | Osborn et al. | |
| 2020/0108465 A1 | 4/2020 | Sweetland | |
| 2020/0193716 A1 | 6/2020 | Ge et al. | |
| 2020/0230745 A1 | 7/2020 | Komsta et al. | |
| 2020/0376761 A1 | 12/2020 | Sweetland | |
| 2021/0339318 A1 | 11/2021 | Dunbar et al. | |
| 2022/0009030 A1 | 1/2022 | Dadelszen et al. | |
| 2023/0056367 A1 | 2/2023 | Leonardo et al. | |

FOREIGN PATENT DOCUMENTS

| | | |
|---|---|---|
| EP | 3 521 028 A1 | 8/2019 |
| WO | WO 2021/224099 A1 | 11/2021 |
| WO | WO 2025/006255 A2 | 1/2025 |

OTHER PUBLICATIONS

McGregor, Davis J., et al. "Analyzing part accuracy and sources of variability for additively manufactured lattice parts made on multiple printers." Additive Manufacturing 40 (2021): 101924. (Year: 2021).*

[No Author Listed], Autobidder, Tesla Other Europe. 2022, 2 pages. https://www.tesla.com/en_eu/support/energy/tesla-software/autobidder (last accessed Dec. 1, 2022).

[No Author Listed], Greedy algorithm. Wikipedia, Jun. 2004. 6 pages. https://en.wikipedia.org/wiki/Greedy_algorithm (last accessed Dec. 1, 2022).

[No Author Listed], Load balancing (computing). Wikipedia, 2006. 17 pages. https://en.wikipedia.org/wiki/Load_balancing_(computing) (last accessed Dec. 1, 2022).

Ferguson et al., Microeconomic Algorithms for Load Balancing in Distrubuted Computer Systems. IEEE, 1988; pp. 491-499.

Kazhdan et al., A Reflective Symmetry Descriptor for 3D Models. Princeton University, 2003; 26 pages. https://gfx.cs.princeton.edu/pubs/Kazhdan_2003_ARS/algorithmica.pdf.

Martinet et al., Accurate Detection of Symmetries in 3D Shapes. ACM Transactions on Graphics. Apr. 2006;25(2):439-64.

Mitra et al., Partial and Approximate Symmetry Detection for 3D Geometry. 2006, 9 pages.

Proffer, A Texas cryptocurrency mining business got $9.2M to cut power last month for grid stability. Riot Blockchain Inc. Published online Aug. 18, 2022, 4 pages. https://www.kvue.com/article/news/investigations/defenders/texas-cryptocurrency-mining-business-cut-power-grid-stability/269-d84d3aef-9667-4952-a45f-28d624e4362c (last accessed Dec. 1, 2022).

Zhang et al., Adaptive Bidding Load Balancing Algorithms in Heterogeneous Distributed Systems. IEEE, InProceedings of International Workshop on Modeling, Analysis and Simulation of Computer and Telecommunication Systems Jan. 31, 1994; pp. 250-254.

* cited by examiner

LOAD BALANCING AND POWER MANAGEMENT FOR ADDITIVE MANUFACTURING SYSTEMS AND PROCESSES

RELATED APPLICATION

This application claims priority under 35 U.S.C. § 119(e) to U.S. Provisional Application No. 63/429,236, filed Dec. 1, 2022, the content of which is incorporated by reference in its entirety for all purposes.

FIELD

Disclosed embodiments are generally related to load balancing and power management for additive manufacturing systems and processes.

BACKGROUND

Additive manufacturing systems employ various techniques to create three-dimensional objects from two-dimensional layers. After a layer of precursor material is deposited onto a build surface, a portion of the layer may be fused through exposure to one or more energy sources to create a desired two-dimensional geometry of solidified material within the layer. Next, the build surface may be indexed, and another layer of precursor material may be deposited. For example, in conventional systems, the build surface may be indexed downwardly by a distance corresponding to a thickness of a layer. This process may be repeated layer-by-layer to fuse many two-dimensional layers into a desired three-dimensional object.

SUMMARY

According to some aspects an additive manufacturing control system comprises at least one controller including one or more processers. The at least one controller is configured to obtain a plurality of build plans for building a plurality of parts with a plurality of additive manufacturing systems. Each additive manufacturing system of the plurality of additive manufacturing systems includes a plurality of energy sources configured to fuse at least a portion of a layer of precursor material on a build surface of the additive manufacturing system and to adjust a timing and/or power of at least one build plan of the plurality of build plans to maintain a sum of power consumed by the plurality of additive manufacturing systems below a power limit. The control system is configured to operate the plurality of additive manufacturing systems using the plurality of build plans to form the plurality of parts.

According to another aspect, a method for controlling power consumption of a plurality of additive manufacturing systems is provided. The method comprises obtaining a plurality of build plans for building a plurality of parts with a plurality of additive manufacturing systems. Each additive manufacturing system of the plurality of additive manufacturing systems includes a plurality of energy sources which fuse at least a portion of a layer of precursor material on a build surface of the additive manufacturing system. The method further comprises adjusting a timing and/or power of at least one build plan of the plurality of build plans to maintain a sum of power consumed by the plurality of additive manufacturing systems below a power limit. The plurality of additive manufacturing systems is operated using the plurality of build plans to form the plurality of parts.

According to one aspect, a method comprises obtaining part geometries related to a first part and a second part to be formed according to at least one build plan, and determining a plurality of part orientations for the first part and the second part. The method further comprises selecting orientations for the first part and the second part to reduce a maximum energy consumption per layer and/or a variation of energy consumption between layers during manufacture of the first part and the second part. The method also includes generating at least one build plan for the first part and the second part based at least in part on the selected orientations. A non-transitory computer readable medium including processor executable instructions when executed by one or more processors perform any one of the methods provided.

According to some aspects, an additive manufacturing control system comprises at least one controller including one or more processers. The at least one controller is configured to obtain part geometries related to a first part and a second part to be formed according to at least one build plan and to determine a plurality of part orientations for the first part and the second part. The additive manufacturing control system is configured to select orientations for the first part and the second part to reduce a maximum energy consumption per layer and/or a variation of energy consumption between layers during manufacture of the first part and the second part and generate at least one build plan for the first part and the second part based at least in part on the selected orientations.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

Other advantages and novel features of the present disclosure will become apparent from the following detailed description of various non-limiting embodiments of the disclosure when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
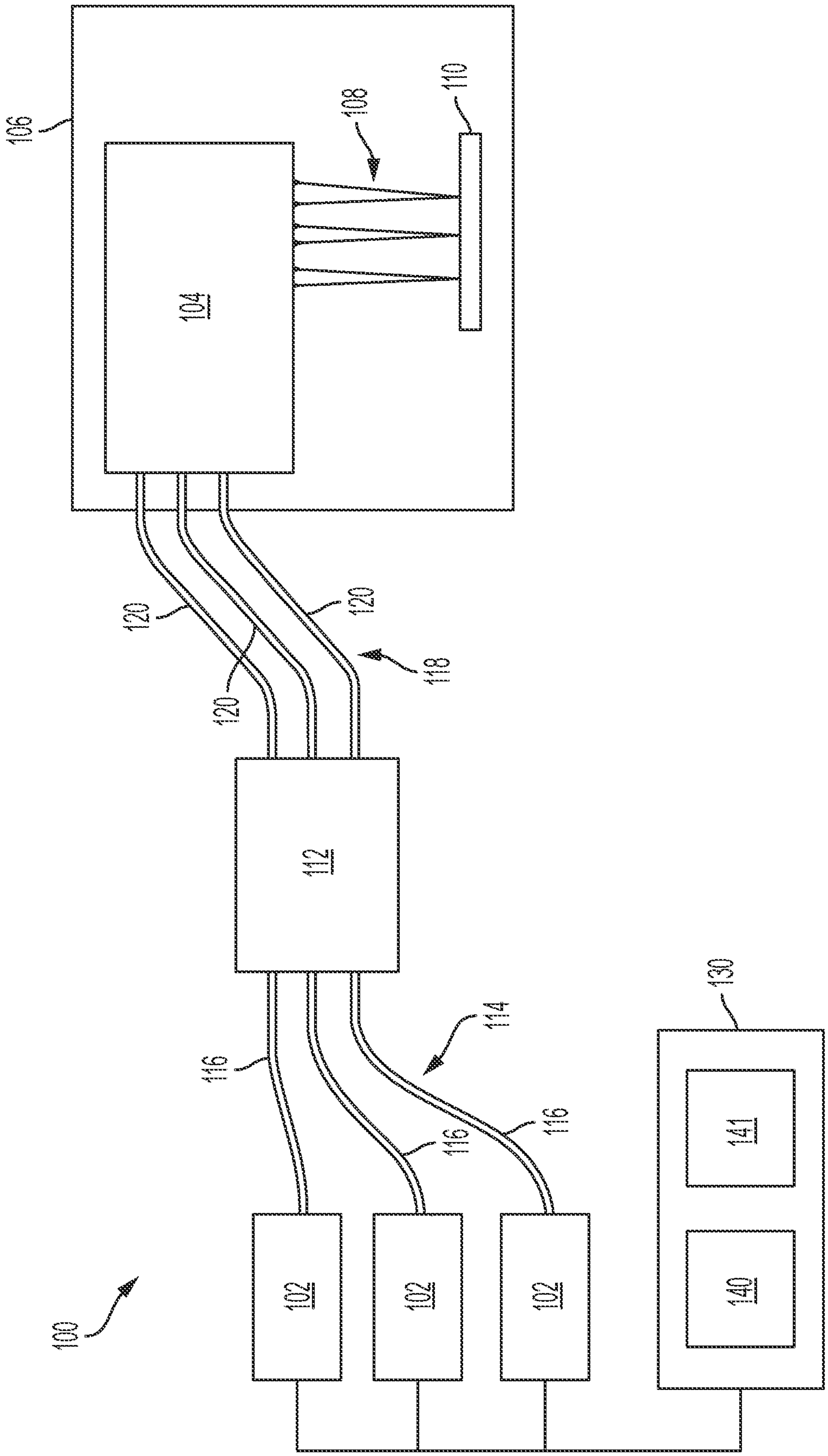
FIG. 1 shows a schematic representation of an additive manufacturing system according to some embodiments.

Many additive manufacturing processes utilize an energy source to sinter, react, melt, or otherwise fuse a metal, polymer, or ceramic precursor material which may be in the form of a filament, a powder, or a liquid. Energy sources may include lasers, radiation (UV, visible light etc.) sources, heaters, ultrasonic sources, electron beams, electrical arcs or other energetic beams. The energy source may cause the fused portion of a precursor material layer on a build surface to bond to the layer below. The energy sources used in additive manufacturing may be the largest users of power in an additive manufacturing process. In some additive manufacturing processes, a plurality of high powered laser energy sources is used, such that the maximum power draw of the laser energy sources for a single system may be thousands of kilowatts. The Inventors have recognized that power usage of additive manufacturing systems varies with time as the systems encounter different stages of manufacturing such that power averaged over some interval of time may be considerably different than the power averaged over some later interval of equal duration. Thus, peak power demand may be substantially higher than average demand. However, limitations on the power available to an additive manufacturing system may exist due to the capacity of the infrastructure supplying power or to regulation, rationing, or any other reason. In reference to powder bed fusion and other types of energy intensive additive manufacturing systems, the Inventors have recognized that this potential for coincident peak demands from multiple systems may limit the number of systems a facility may operate, cause power distribution system damage, result in an inability to operate the systems, and/or other undesirable situations. Thus, the Inventors have recognized that better control of the power usage of either single additive manufacturing systems and/or multiple additive manufacturing systems may help to permit the usage of larger additive manufacturing systems and/or greater numbers of these systems within a facility.

In view of the above, the Inventors have recognized that load balancing either through control of individual additive manufacturing systems and/or through coordinating the operation of multiple additive manufacturing systems may be used to reduce, or otherwise limit, an expected peak power demand during operation of the additive manufacturing systems. For example, as elaborated on further below, in some embodiments, part placement and orientation may be used to coordinate or otherwise control the amount and/or timing of high and low energy periods for a plurality of energy sources during building of a plurality of parts being built on one or more additive manufacturing systems. Alternatively or additionally, in some embodiments, coordinating the different phases of build processes amongst a plurality of separate additive manufacturing systems may be used to reduce the combined maximum power demand of the systems during a manufacturing process by reducing overlapping periods of high power demand by the different additive manufacturing systems. It should be understood that the various load balancing methods disclosed herein may either be used individually and/or concurrently as the disclosure is not so limited.

As elaborated on further below, the power demand of an additive manufacturing energy source (e.g., a laser energy source) may exhibit peaks of high energy usage and valleys of low energy usage during a build process. Depending on the process step, the peaks and valleys may resemble a square wave, or a sinusoid, or a stochastically varying curve or other shape. The energy usage of these energy sources between two different additive manufacturing systems may be similar, although the timing, amplitudes, periodicities, waveforms, and other usage parameters may differ between the two energy systems. If both energy sources were fully energized concurrently, the power peaks could be said to be aligned, and the total instantaneous power would be the sum of the first power at that instant and the second power at that instant. If instead, the first energy source was energized only when the second source rested, and the first energy source rested while the second source was energized, the maximum instantaneous power would only be that of a single energy source. Thus, by coordinating the timing and/or operation of the energy sources such that periods of lower power consumption of one additive manufacturing system may be at least partially synchronous (i.e., occur at the same time) with period of higher power consumption for another additive manufacturing system, it may be possible to reduce a maximum power usage of the combined systems during operation. This process may be used to coordinate operation of groups of additive manufacturing systems with any number of energy sources allowing power peaks of one or more additive manufacturing systems to be coordinated with power valleys from one or more other additive manufacturing systems (and vice versa).

As noted above, coordinating the timing and usage of energy sources by multiple different additive manufacturing systems may limit the instantaneous combined power draw of the group of additive manufacturing systems to a value lower than the sum if all of the systems were simultaneously operating at a maximum power of each system. Thus, as elaborated on further below, system timing and coordination may be applied to any additive manufacturing process, or associated build plan, where the power demand varies over some period of time such that a period of high power demand of one process (e.g., fusing precursor material with one or more energy sources) can be performed during a time duration that at least partially overlaps with a period of low power demand of another separate additive manufacturing system (e.g., when the other system is not fusing precursor material). For instance, coordination between one or more controllers controlling the operation of a plurality of manufacturing systems may allow the timing of high power processes and low power processes being performed on multiple additive manufacturing systems to be coordinated with one another such that a portion of the systems are operating in a lower power mode and a portion of the systems are operating in a higher power mode simultaneously so that a combined power during operating of the group of additive manufacturing systems may be maintained below a desired power limit. For example in one embodiment, this may include obtaining a plurality of build plans that include layer by layer specifications for building a plurality of parts with a plurality of additive manufacturing systems. Each additive manufacturing system of the plurality of additive manufacturing systems may include a plurality of energy sources, such as laser energy sources, configured to fuse layers of precursor material on a build surface of the additive manufacturing system to form the plurality of parts. One or more controllers associated with the separate additive manufacturing systems may then control the timing, scan rates, energy source powers, and/or other appropriate parameters commanded by the build plans to maintain a sum of the power consumed by the plurality of additive manufacturing systems below the predetermined power limit.

In addition to the above, the Inventors have recognized that the orientation of parts within one or more build plates on one or more additive manufacturing systems may also influence the peak power demands of the additive manufacturing systems producing those parts. Specifically, a build orientation of a part establishes the layer cross sections for that part during a build, and the energy consumption per layer corresponds to the energy used to fuse the precursor material in a single build layer. For example, if there are two parts being built, there is a maximum energy consumption associated with the build layer having the largest fused area within the plurality of build layers used to form the first and second parts. The maximum energy may correspond to the layer with the largest sum of transverse cross sectional areas of the first and second parts. This may correspond to the maximum energy consumption per layer for the plurality of layers used to form the corresponding one or more parts during a build process. An arrangement of layers that reduces the maximum per layer energy consumption amongst the plurality of layers on one or more build plates may help to reduce the number and/or magnitude of overlapping periods during which multiple additive manufacturing systems are fusing material at the same time. As noted above, this may help to reduce a maximum combined power demand (i.e., a peak combined power demand) when multiple additive manufacturing systems are operating simultaneously with one another.

In view of the above, in some embodiments, it may be desirable to select orientations of a plurality of parts being built on one or more build plates at the same time to provide a more uniform per layer energy usage during the manufacturing process. This may include orientation selection for parts on a single build plate and/or within multiple build plates where the layer formation of parts with different orientations on the different plates may be coordinated. Appropriate methods for determining and/or selecting between potential part orientations are elaborated on further below.

Within a group of additive manufacturing systems, timing coordination and part orientation strategies may be employed separately or in combination to reduce the combined power demand in the additive manufacturing processes as the disclosure is not limited in this way. Factors that affect the best approach may include the number of different part geometries being simultaneously manufactured, the geometries themselves, and the number of simultaneously manufactured parts and simultaneously active build plates. Customer requirements and manufacturing capabilities may additionally affect the selection of one orientation in place of a different orientation, such as to achieve a better surface finish or lower probability of defects.

When selecting part orientations for use with the plurality of parts to reduce variation in energy consumption per layer, the variation in fused area and/or energy consumption for fusing precursor material per layer may be less than or equal to 10%, 20%, 30%, 50%, 75%, 99% and/or any other appropriate percentage of the maximum fused area and/or energy consumption per layer for the different parts in the determined orientations. Of course, other percentages both greater than and less than those noted above are also contemplated as the disclosure is not so limited. The fill rate of a part can vary from 0% to 100% spanning the whole scale of useable energy per layer, 0% to 99%, and/or any other appropriate combination of the foregoing. The amount of total energy to form a part may be independent of the orientation of the part, however the peak power can be reduced through orientation and by timing coordination with other systems.

As noted above, the disclosed methods may either be used individually or in combination with one another. However, when timing and orientation strategies are used together a greater benefit may be achieved by employing these techniques together in some embodiments. For instance, if two build plates are being manufactured simultaneously, a first build plate may be selected to have a high layer energy consumption while a second build plate has a low layer energy consumption during a first portion of a build process and at another point in the build process the first build plate may have a low layer energy consumption power and the second build plate may have a high layer energy consumption. The high and lower power operating modes associated with the formation of these different build plans may then be coordinated to provide additional combine power reduction as elaborated on further below. Of course, instances in which different numbers of build plates/additive manufacturing systems are used and/or different benefits are provided as the disclosure is not limited in this fashion.

Energy sources used to join, sinter, react, or otherwise fuse a precursor material may be responsible for periods of high energy load. For instance, for an additive manufacturing process using a plurality of high power laser energy sources, the power demand of a single additive manufacturing system may exceed 100 kW, 180 kW, or 1000 kW during a period of high power load when the lasers are operational. Other manufacturing processes that occur during additive manufacturing, such as translating the build plate or recoating steps may be considered low energy processes. Low energy processes may have power demands several orders of magnitude lower than high energy processes. For example, in some embodiments, low power demands may be between or equal to 10 W and 500 W for instance during a recoating or translation step. Low power demands may peak at a few kilowatts (e.g., 1 kW to 3 kW) in some embodiments. In other embodiments in which a build plate may be heated; the power demand on a heated build plate may be between or equal to 10 kW to 100 kW during peak heating and may modulate or cycle to a lower power to maintain a build plate temperature. Depending on the power demand, such a process may either be included as part of a lower power mode and/or as part of a high power mode. In either case, appropriate coordinating of the high and low energy modes for different additive manufacturing systems may offer potentially large reductions in maximum combined power loads for multiple systems. However, ranges both greater than and less than those noted above are also contemplated.

As used herein, the term build plan and other similar terms may refer to the planned paths traced by the energy sources in the additive manufacturing process, including the thickness of each build layer, to form the plurality of build layers of one or more parts on a build plate. Build plans may additionally include other information such as the energy sources that are operational, the intensities at which the energy sources may operate and other process information. The paths traced by the one or more energy sources may be determined prior to the start of the manufacturing process. In some embodiments, parameters associated with an individual layer of build plan, such as energy source intensity, may be adjusted during a build. For example, a build plan may include the specific energy source power settings, weld or formation speed, recoating rates, and/or other process related information. The various processing parameters, including power settings and weld or formation speed, may be actively changed during a build to help coordinate power usage between one or more additive manufacturing systems.

The desired maximum combined power or power limit imposed on asset of additive manufacturing systems may vary as a function of time including during the time during which a process is running. A power limit such may change as the available power such as the available power for additive manufacturing systems within a facility or factory changes. Power changes may occur as a result of a utility restricting use or incentivizing conservation, or as a result of other power usage elsewhere in the facility or other reasons. If the power limit changes during the manufacturing process, an updated power limit may be used in place of the previous power limit. In some embodiments, a power limit may be determined based at least in part on one or more power parameters such as: power availability; one or more selected from; build duration of parts, the length of time a process has been operating, resources expended on a part or process, an instantaneous price of power, value of incentives offered to reduce power consumption during periods of high power demand, a priority of an part being built, a cost of an part being built, a sale price for an part being built, future scheduling of additive manufacturing processes, an operational health of at least one additive manufacturing system of the plurality of additive manufacturing systems (e.g., systems with greater numbers and/or severity of operational faults may be prioritized lower than systems that are functioning at full capacity), historical data on machine performance and reliability, historical data on process quality, manufacturing quality metrics of a part being manufactured, power usage data from other devices, anticipated changes in future power cost or availability, and power usage restrictions. The power limit established by the controllers may vary as a function of time or in response to changing conditions.

In some embodiments, the price of power (or equivalently the price of energy) may be included in the prioritization of a coordinated manufacturing system. The cost of power may be lower during some periods and higher during other periods. These periods could correspond with night and day, or they could occur over shorter or longer timescales. Some additive manufacturing processes may require runtimes during an interval of time long enough to encompass one or more temporal changes in the cost of power. In such case, it may not be possible to perform the process entirely during the period of lowest cost. In this example, high power processes may be prioritized to occur during periods of lower power cost and lower power processes prioritized to occur during periods of higher power cost. In some cases, it may be possible to perform this prioritization without increasing the total run time of the manufacturing process. In other cases, the cost savings for power may be greater than the opportunity cost of increased run time such that the prioritization remains economically advantageous. Likewise, available power quotas may vary over the course of some interval of time that is shorter than the best case run-time of the manufacturing process. One example would be power restrictions or “brown outs” that may occur during times of peak power usage. In this example, high power processes may be prioritized to occur during periods of higher power quotas and lower power processes prioritized to occur during periods of lower power quotas. Varying cost of electricity and financial incentives for reducing electricity usage may create an incentive for artificially adjusting the power limit. For instance, it may become more financially desirable to restrict usage even if that usage restriction is not mandatory. In some cases, this may mean slowing the manufacturing process so that high energy usage steps occur at times of lower energy cost. At other times it may mean slowing, delaying or in extreme cases abandoning parts in return for incentives to reduce power usage. Customer requirements may dictate specific manufacturing build parameters, such as to ensure weld quality between layers or to minimize thermal gradients within a part. Such parts may therefore be ineligible for process changes that would otherwise reduce power such as reducing laser power or building delays into recoating operations. Also, some parts may be prioritized based on the resources already expended on those parts, for instance a part that is 39 hours into a 40 hour build may be prioritized over an otherwise identical part that is near the beginning of its build time.

As used herein additive manufacturing processes may be described as being synchronous when the build time of the manufacturing processes at least partially overlaps. For instance, forming layers of a first part and forming layers of a second part are at least partially synchronous with one another when the build times of the first and second parts at least partially overlap with one another. This may occur, for example, forming the first and second parts in the same layer on the same build plate, or when forming the first and second parts in different layers on different build plates at the same time. Build time includes the time elapsed between the start of deposition of the first layer and the completion of fusion in the final layer. During the build time, one or more energy sources may be cycling off and on or between high and low power states. Energy usage should be expected to fluctuate during the build time. Synchronous additive manufacturing processes may include times when all, some or no energy sources are consuming power. For instance, two synchronously running additive manufacturing systems may at any given instant have one additive manufacturing system fusing precursor material with lasers to a first build surface while the second additive manufacturing system is recoating precursor material onto a second build surface. Alternatively, two synchronously operating processes may be simultaneously fusing material, or two synchronously operating processes may be simultaneously recoating their respective build plates. Synchronous manufacturing processes are not the same as simultaneous use or concurrent energization of two or more energy sources. For additive manufacturing systems utilizing laser energy sources, the lasers do not need to be on at the same time for the manufacturing process to be occurring synchronously.

While some embodiments described herein are consistent with laser powder bed fusion additive manufacturing processes, this disclosure is not limited to powder bed fusion additive manufacturing processes. Aspects apply to load balancing and power optimization generally and to power optimization of other additive manufacturing processes, including additive manufacturing processes where the precursor material includes a polymer, composite, ceramic, or a metal. Embodiments are contemplated where the additive manufacturing processes include vat photopolymerization for instance stereolithography (SLA); material or binder jetting processes; material extrusion for instance as fused deposition modeling (FDM) or filament based 3D printers; sheet lamination processes; directed energy deposition processes; and other powder bed fusion processes such as electron beam melting. Aspects may be applied to manufacturing systems including multiple types of additive manufacturing processes and/or additive manufacturing processes in combination with other manufacturing processes.

Depending on the embodiment, the disclosed methods and systems may maintain the combined power demand of a plurality of additive manufacturing systems during operation to be less than any appropriate proportion of a potential maximum peak demand if all of the systems were operated at maximum power of each system simultaneously. For example, a combined power of the additive manufacturing systems may be maintained to be less than or equal to 90%, 80%, 70%, 60%, and/or any other appropriate percentage of the potential maximum peak combined power of the systems. The combined power of the additive manufacturing systems may also be controlled to be greater than or equal to 50%, 60%, 70%, and/or any other appropriate percentage of the potential maximum peak combined power of the additive manufacturing systems. Combinations of the above are contemplated, including ranges between or equal to 50% and 90%, 50% and 70%, and/or other appropriate ranges. Of course other percentages of the potential maximum peak combined power of the additive manufacturing systems both greater than and less than those noted above are also contemplated as the disclosure is not so limited.

Depending on the particular embodiment, an additive manufacturing system according to the current disclosure may include any suitable number of laser energy sources. For example, in some embodiments, the number of laser energy sources may be at least 5, at least 10, at least 50, at least 100, at least 500, at least 1,000, at least 1,500, or more. In some embodiments, the number of laser energy sources may be less than 2,000, less than 1,500, less than 1,000, less than 500, less than 100, less than 50, or less than 10. Additionally, combinations of the above-noted ranges may be suitable. Ranges both greater and less than those noted above are also contemplated as the disclosure is not so limited.

Additionally, in some embodiments, a power output of a laser energy source (e.g., a laser energy source of a plurality of laser energy sources) may be between about 50 W and about 2,000 W (2 kW). For example, the power output for each laser energy source may be between about 100 W and about 1.5 kW, and/or between about 500 W and about 1 kW. Moreover, a total power output of the plurality of laser energy sources may be between about 500 W (0.5 kW) and about 4,000 kW. For example, the total power output may be between about 1 kW and about 2,000 kW, and/or between about 100 kW and about 1,000 kW. Ranges both greater and less than those noted above are also contemplated as the disclosure is not so limited.

In some embodiments, incident laser spots on a build surface may be arranged in a line with a long dimension and a short dimension, or in an array. In either case, according to some aspects, a line, or array, of incident laser energy consists of multiple individual laser energy pixels arranged adjacent to each other that can have their respective power levels individually controlled. Each laser energy pixel may be turned on or turned off independently and the power of each pixel can be independently controlled. The resulting pixel-based line or array may then be scanned across a build surface to form a desired pattern thereon by controlling the individual pixels during translation of the optics assembly.

Depending on the embodiment, an array of laser energy pixels (e.g., a line array or a two dimensional array) may have a uniform power density along one or more axes of the array including, for example, along the length dimension (i.e. the longer dimension) of a line array. In other instances, an array can have a non-uniform power density along either of the axes of the array by setting different power output levels for each pixel's associated laser energy source. Moreover, individual pixels on the exterior portions of the array can be selectively turned off or on to produce an array with a shorter length and/or width. In some embodiments, the power levels of the various pixels in an array of laser energy may be independently controlled throughout an additive manufacturing process. For example, the various pixels may be selectively turned off, on, or operated at an intermediate power level to provide a desired power density within different portions of the array.

Generally, laser energy produced by a laser energy source has a power area density. In some embodiments, the power area density of the laser energy transmitted through an optical fiber is greater than or equal to 0.1 W/micrometer$^2$, greater than or equal to 0.2 W/micrometer$^2$, greater than or equal to 0.5 W/micrometer$^2$, greater than or equal to 1 W/micrometer$^2$, greater than or equal to 1.5 W/micrometer$^2$, greater than or equal to 2 W/micrometer$^2$, or greater. In some embodiments, the power area density of the laser energy transmitted through the optical fiber is less than or equal to 3 W/micrometer$^2$, less than or equal to 2 W/micrometer$^2$, less than or equal to 1.5 W/micrometer$^2$, less than or equal to 1 W/micrometer$^2$, less than or equal to 0.5 W/micrometer$^2$, less than or equal to 0.2 W/micrometer$^2$, or less. Combinations of these ranges are possible. For example, in some embodiments, the power area density of the laser energy transmitted through the optical fiber is greater than or equal to 0.1 W/micrometer$^2$ and less than or equal to 3 W/micrometer$^2$.

Depending on the application, output of the optics assembly may be scanned across a build surface of an additive manufacturing system in any appropriate fashion. For example, in one embodiment, one or more galvo scanners may be associated with one or more laser energy sources to scan the resulting one or more laser pixels across the build surface. Alternatively, in other embodiments, an optics assembly may include an optics head that is associated with one or more appropriate actuators configured to translate the optics head in a direction parallel to a plane of the build surface to scan the one or more laser pixels across the build surface. In either case, it should be understood that the disclosed systems and methods are not limited to any particular construction for scanning the laser energy across a build surface of the additive manufacturing system.

For the sake of clarity, transmission of laser energy through an optical fiber is described generically throughout. However, with respect to various parameters such as transverse cross-sectional area, transverse dimension, transmission area, power area density, and/or any other appropriate parameters related to a portion of an optical fiber that the laser energy is transmitted through, it should be understood that these parameters refer to either a parameter related to a bare optical fiber and/or a portion of an optical fiber that the laser energy is actively transmitted through such as an optical fiber core, or a secondary optical laser energy transmitting cladding surrounding the core. In contrast, any surrounding cladding, coatings, or other materials that do not actively transmit the laser energy may not be included in the disclosed ranges.

It will be appreciated that any embodiments of the systems, components, methods, and/or programs disclosed herein, or any portion(s) thereof, may be used to form any part suitable for production using additive manufacturing. For example, a method for additively manufacturing one or more parts may, in addition to any other method steps disclosed herein, include the steps of selectively fusing one or more portions of a plurality of layers of precursor material deposited onto the build surface to form the one or more parts. This may be performed in a sequential manner where each layer of precursor material is deposited on the build surface and selected portions of the upper most layer of precursor material is fused to form the individual layers of the one or more parts. This process may be continued until the one or more parts are fully formed.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 shows, according to some embodiments, a schematic representation of an additive manufacturing system 100, including a plurality of laser energy sources 102 that deliver laser energy to an optics assembly 104 positioned within a machine enclosure 106. For example, the machine enclosure may define a build volume in which an additive manufacturing process may be carried out. In particular, the optics assembly may direct laser energy 108 towards a build surface 110 positioned within the machine enclosure to selectively fuse powdered material on the build surface. As described in more detail below, the optics assembly 104 may include a plurality of optics defining an optical path within the optics assembly that may transform, shape, and/or direct laser energy within the optics assembly such that the laser energy is directed onto the build surface as an array of laser energy pixels. In some embodiments, the optics assembly may be movable within machine enclosure 106 to scan laser energy 108 across build surface 110 during a manufacturing process. For example, the optics assembly may be associated with appropriate actuators, rails, motors, and/or any other appropriate structure capable of optics assembly relative to the surface. Alternatively, embodiments in which the optics assembly includes galvo mirrors or other appropriate components that are configured to scan the laser energy 108 across the build surface while the optics assembly is held stationary relative to the build surface are also contemplated.

In some embodiments, the additive manufacturing system 100 further includes one or more optical fiber connectors 112 positioned between the laser energy sources 102 and the optics assembly 104. As illustrated, a first plurality of optical fibers 114 may extend between the plurality of laser energy sources 102 and the optical fiber connector 112. In particular, each laser energy source 102 may be coupled to the optical fiber connector 112 via a respective optical fiber 116 of the first plurality of optical fibers 114. Similarly, a second plurality of optical fibers 118 extends between the optical fiber connector 112 and the optics assembly 104. Each optical fiber 116 of the first plurality of optical fibers 114 is coupled to a corresponding optical fiber 120 of the second plurality of optical fibers 118 within the optical fiber connector. In this manner, laser energy from each of the laser energy sources 102 is delivered to the optics assembly 104 such that laser energy 108 can be directed onto the build surface 110 during an additive manufacturing process (i.e., a build process). Of course, other methods of connecting the laser energy sources 102 due to the optics assembly 104 are also contemplated.

A controller 130 is illustrated including processor 140 and memory 141. Memory may include one or more hard drives, solid state drives or other non-transitory computer readable memory. The non-transitory computer readable memory may include processor executable instructions that when executed by the one or more processors cause the additive manufacturing system to perform any of the methods disclosed herein. The controller is shown with connection to laser energy sources 102 and may govern the operation of the laser energy sources. However, the controller may be configured to control operation of any appropriate portion of the additive manufacturing system as the disclosure is not limited in this fashion. Additionally, while one controller with one processor is illustrated the disclosure should not be limited in that way. Multiple controllers are contemplated, including controllers to coordinate multiple additive manufacturing systems. Some controllers may be supervisory controllers. Controllers may include parallel processors which may include physically separate computers. While the controller is illustrated in proximity to the additive manufacturing system, the controller may be located in any convenient location and may communicate with the additive manufacturing system over a network including over the internet.

Figure 2A:
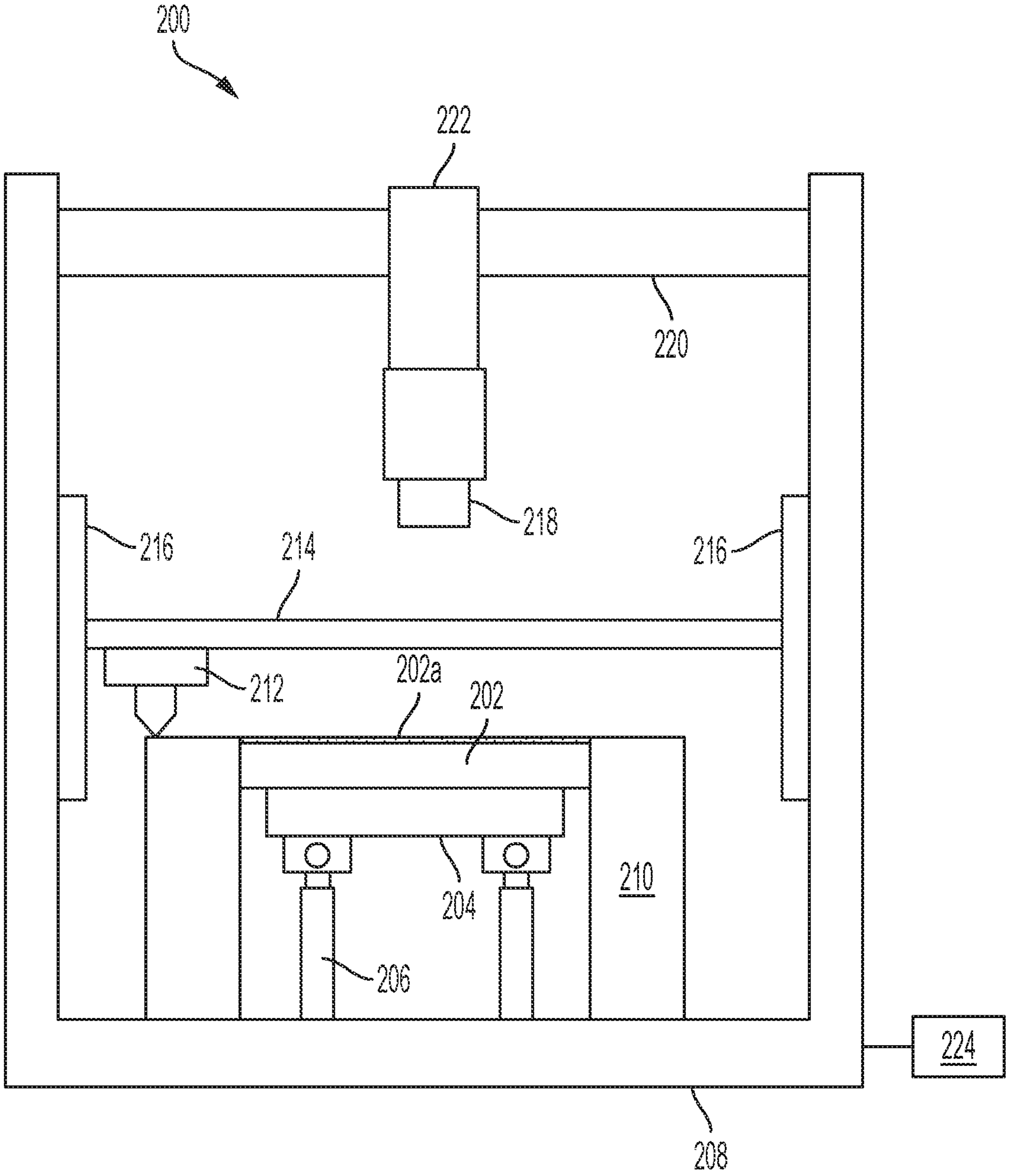
FIG. 2A shows an additive manufacturing system according to some embodiments.

FIG. 2A depicts one embodiment of an additive manufacturing system 200 at the beginning of a build process. The additive manufacturing system includes a build plate 202 mounted on a fixed plate 204, which is in turn mounted on one or more vertical supports 206 that attach to a base 208 of the additive manufacturing system. In the depicted embodiment, the one or more vertical supports may correspond to one, two, and/or any other appropriate number of supports configured to support the build plate, and the corresponding build surface, at a desired position and orientation. For example, the supports depicted in the figure may correspond to one or more vertical motion stages configured to control a vertical position and orientation of the build plate. A powder containment shroud 210 may at least partially, and in some embodiments completely, surround a perimeter of the build plate 202 to support a volume of precursor material 202*a*, such as a volume of powder, disposed on the build plate and contained within the shroud. The shroud may be supported on the base 208 or by any other appropriate portion of the system.

The additive manufacturing system may include a powder deposition system in the form of a recoater 212 that is mounted on a horizontal motion stage 214 that allows the recoater to be moved back and forth across either a portion, or entire, surface of the build plate 202. As the recoater traversers the build surface of the build plate, it deposits a precursor material 202*a*, such as a powder, onto the build plate and smooths the surface to provide a layer of precursor material with a predetermined thickness on top of the underlying volume of fused and/or unfused precursor material deposited during prior formation steps.

In some embodiments, the supports 206 of the build plate 202 may be used to index the build surface of the build plate 202 in a vertical downwards direction relative to a local direction of gravity. In such an embodiment, the recoater 212 may be held vertically stationary for dispensing precursor material 202*a*, such as a precursor powder, onto the exposed build surface of the build plate as the recoater is moved across the build plate each time the build plate is indexed downwards.

In some embodiments, the additive manufacturing system may also include an optics assembly 218 that is supported vertically above and oriented towards the build plate 202. As detailed above, the optics assembly may be optically coupled to one or more laser energy sources, not depicted, to direct laser energy in the form or one or more laser energy pixels onto the build surface of the build plate 202. To facilitate movement of the laser energy pixels across the build surface, the optics assembly may be configured to move in one, two, or any number of directions in a plane parallel to the build surface of the build plate. To provide this functionality, the optics assembly may be mounted on a gantry 220, or other actuated structure, that allows the optics unit to be scanned in plane parallel to the build surface of the build plate.

In the above embodiment, the build plate is indexed vertically while the remaining active portions of the system are held vertically stationary. However, embodiments, in which the build plate is held vertically stationary and the shroud 210, recoater 212, and optics assembly 218 are indexed vertically upwards relative to a local direction of gravity during formation of successive layers are also contemplated. In such an embodiment, the recoater horizontal motion stage 214 may be supported by vertical motion stages 216 that are configured to provide vertical movement of the recoater relative to the build plate. Corresponding vertical motion stages may also be provided for the shroud 210, not depicted, to index the shroud vertically upward relative to the build plate in such an embodiment. In some embodiments, the additive manufacturing system may also include an optics assembly 218 that is supported on a vertical motion stage 220 that is in turn mounted on the gantry 220 that allows the optics unit to be scanned in the plane of the build plate 202.

In the above embodiment, the vertical motion stages, horizontal motion stages, and gantry may correspond to any appropriate type of system that is configured to provide the desired vertical and/or horizontal motion. This may include supporting structures such as: rails; linear bearings, wheels, threaded shafts, and/or any other appropriate structure capable of supporting the various components during the desired movement. Movement of the components may also be provided using any appropriate type of actuator including, but not limited to, electric motors, stepper motors, hydraulic actuators, pneumatic actuators, electric actuators, and/or any other appropriate type of actuator as the disclosure is not so limited.

In addition to the above, in some embodiments, the depicted additive manufacturing system may include one or more controllers 224 that is operatively coupled to the various actively controlled components of the additive manufacturing system. For example, the one or more controllers may be operatively coupled to the one or more supports 206, recoater 212, optics assembly 218, the various motion stages, energy sources (not depicted) associated with the optics assembly or other portion of the system, and/or any other appropriate component of the system. In some embodiments, the controller may include one or more processors and associated non-transitory computer readable memory. The non-transitory computer readable memory may include processor executable instructions that when executed by the one or more processors cause the additive manufacturing system to perform any of the methods disclosed herein.

Figure 2B:
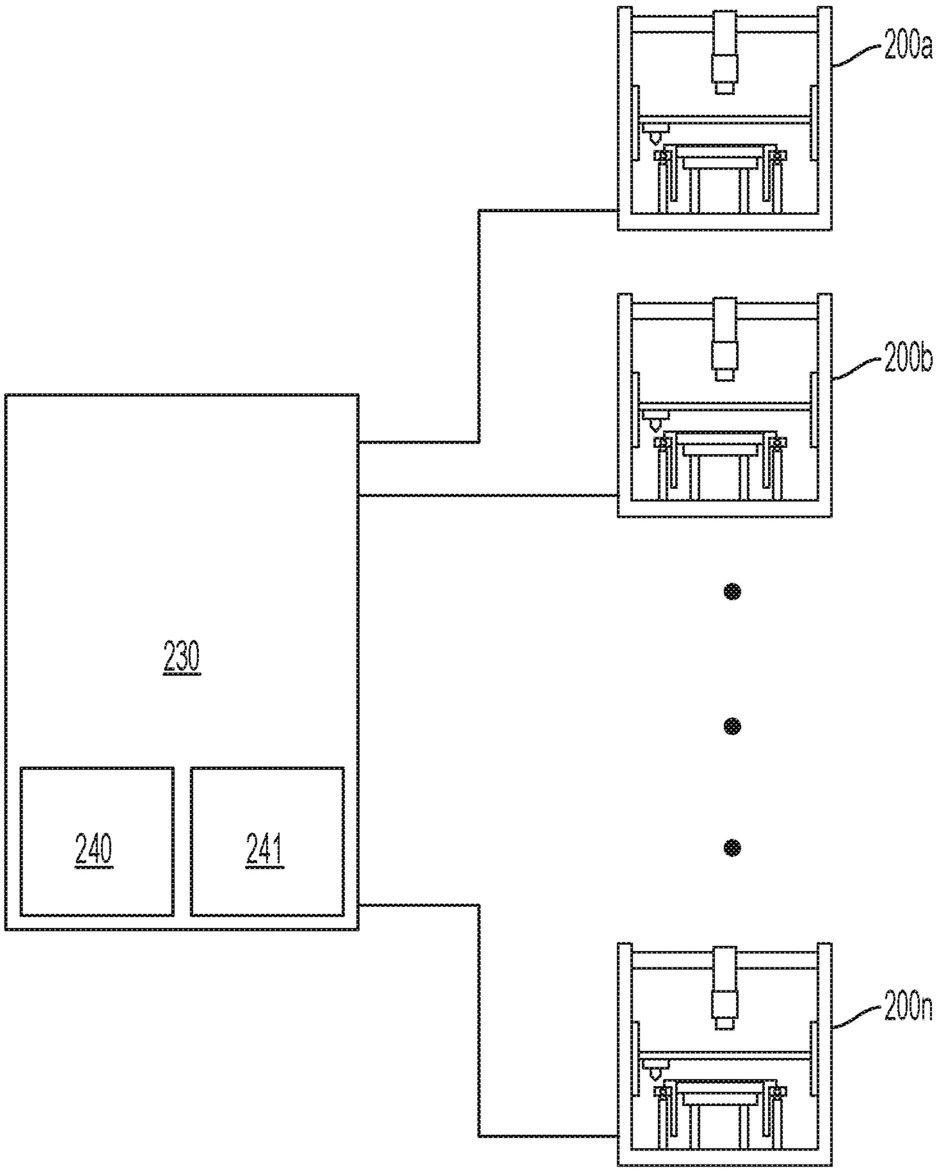
FIG. 2B shows multiple additive manufacturing systems according to some embodiments.

FIG. 2B shows a plurality of additive manufacturing systems which may be similar to the embodiment of FIG. 2A and may be located within an additive manufacturing facility. Individual additive manufacturing systems are numbered 200*a*-200*n* for a grouping of n systems, n being any positive integer greater than 1. Each individual system, for instance system 200*a*, may include all components previously described for the individual system 200 illustrated in FIG. 2A. It should be appreciated that a plurality of additive manufacturing systems may also include a plurality of additive manufacturing systems different from those illustrated in FIG. 2A. The individual systems of 200*a*-200*n* may be any additive manufacturing system that may employ any additive manufacturing process. The plurality of additive manufacturing systems may include different additive manufacturing systems and different additive manufacturing processes within the same group such that for instance system 200*a* and system 200*b* may be different in size, process type, appearance, or in any other appropriate manner as this disclosure is not limited in this way. Of course, the plurality of additive manufacturing systems may also be a plurality of identical additive manufacturing systems.

In addition to the above, in some embodiments, the depicted additive manufacturing systems may include one or more controllers 230 that are operatively coupled to the various additive manufacturing systems 200*a*-200*n*. Each system 200*a*-200*n*, for instance 200*a*, may have its own controller as illustrated in FIG. 2A in addition to controller 230. In some embodiments, the one or more controllers may include one or more processors 240 and associated non-transitory computer readable memory 241. The non-transitory computer readable memory may include processor executable instructions that when executed by the one or more processors cause the additive manufacturing systems to perform any of the methods disclosed herein.

According to some embodiments, at least one controller is a central controller operatively associated with each additive manufacturing system of the plurality of additive manufacturing systems. According to other embodiments, at least one controller includes a controller of each additive manufacturing system of the plurality of additive manufacturing systems. The at least one controller may be configured to adjust the timing and/or power of each build plan. Individual system may operate cooperatively with a central controller or a central controller may control the plurality of additive manufacturing systems directly.

Within a plurality of additive manufacturing systems, coordination between one or more controllers and a plurality of additive manufacturing systems can allow individual additive manufacturing machines to be prioritized to balance the sum of high load processes and low load processes occurring at each instant while the additive manufacturing system is in operation. Timing and coordinating the usage of energy sources may be adaptive and need not be determined before the start of the build process. Timing may be adjusted in response to changing conditions, including conditions that could not be known or anticipated at the time that the build or manufacturing portion of the additive manufacturing process was initiated.

Figure 3:
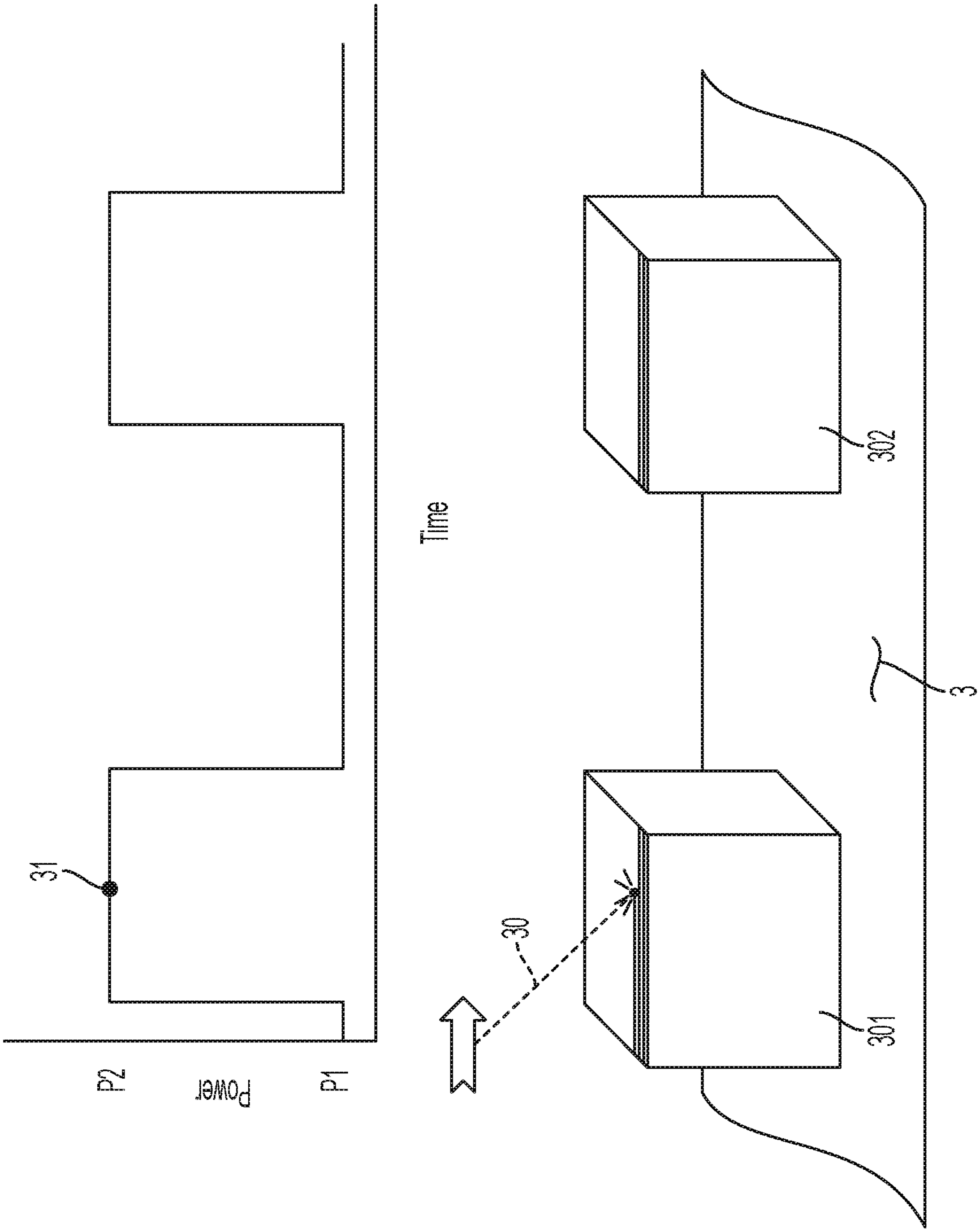
FIG. 3 shows a part being manufactured by one embodiment of an additive manufacturing system and accompanying power usage.

FIG. 3 shows a schematic of one embodiment of an additive manufacturing process and a representative plot of power usage as a function of time during a portion of that process according to one illustrative embodiment. The illustrated example is consistent with a laser powder bed fusion process with a single laser energy source, however this schematic is offered to illustrate a concept that may apply to any type of additive manufacturing process and should not be limited to any one type of process, or any one type or number of energy sources.

Incomplete parts 301 and 302 are shown undergoing manufacture on build plate 3. An energy source, in this case a laser beam 30 from a laser energy source, is shown fusing precursor material on part 301. The laser 30 is traversing to the right as illustrated by the arrow. The plot above the illustration depicts the manufacturing system power over the time required for the laser to move from the left side of the illustration to the right side of the illustration. The plot and the illustration are aligned so that the power peaks line up with the parts 301 and 302 that are responsible for causing those power peaks. At the instant illustrated, the laser is at point 31 on the plot. Laser intensity is increased when the laser is fusing precursor material in a high power mode and deceased (e.g., a decreased intensity or turned off) to a lower power mode when the laser is traversing between parts. The system power varies from power P1 when the laser is not fusing to a lower power P2 when the laser is fusing material on the build surface of part 301 or 302. The area onto which the laser is fusing corresponds to a cross section of parts 301 and 302 that is a slice of each of the respective part. Laser 30 is executing build plans for those slices. Note that power P1 may be non-zero as some power is used to translate the laser and/or build plate relative to each other as well as for other potential processes such as cooling fans, sensors, controllers, and/or any other appropriate component. When the laser transverses to reach an edge of the part the laser power is increased to P2. As illustrated the increase in laser power is illustrated as a step function although it should be noted that this is for illustrative purposes and the actual power increase may not be as abrupt as in the illustration. In many additive manufacturing process, the fusing energy sources (here a laser 30 from a laser energy source) may be responsible for the majority of the power usage of the additive manufacturing system when a precursor material is being fused to form a portion of a part. Contributions from stage translating motors, controllers, cooling fans, and other components may be significantly smaller and are not typically limiting to the operation of the manufacturing process.

Figure 4:
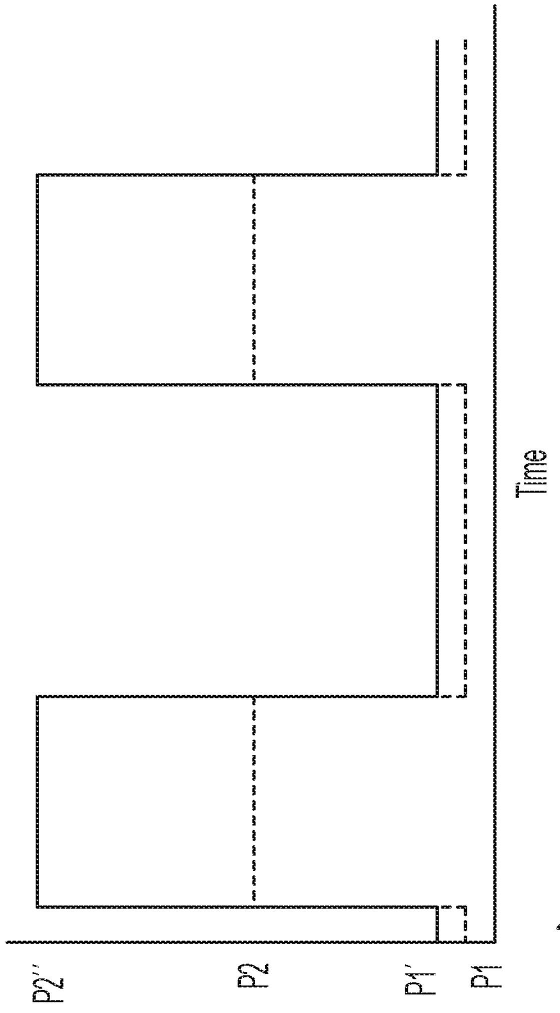
FIG. 4 shows two parts being manufactured by another embodiment additive manufacturing system and accompanying power usage.
Figure 4:
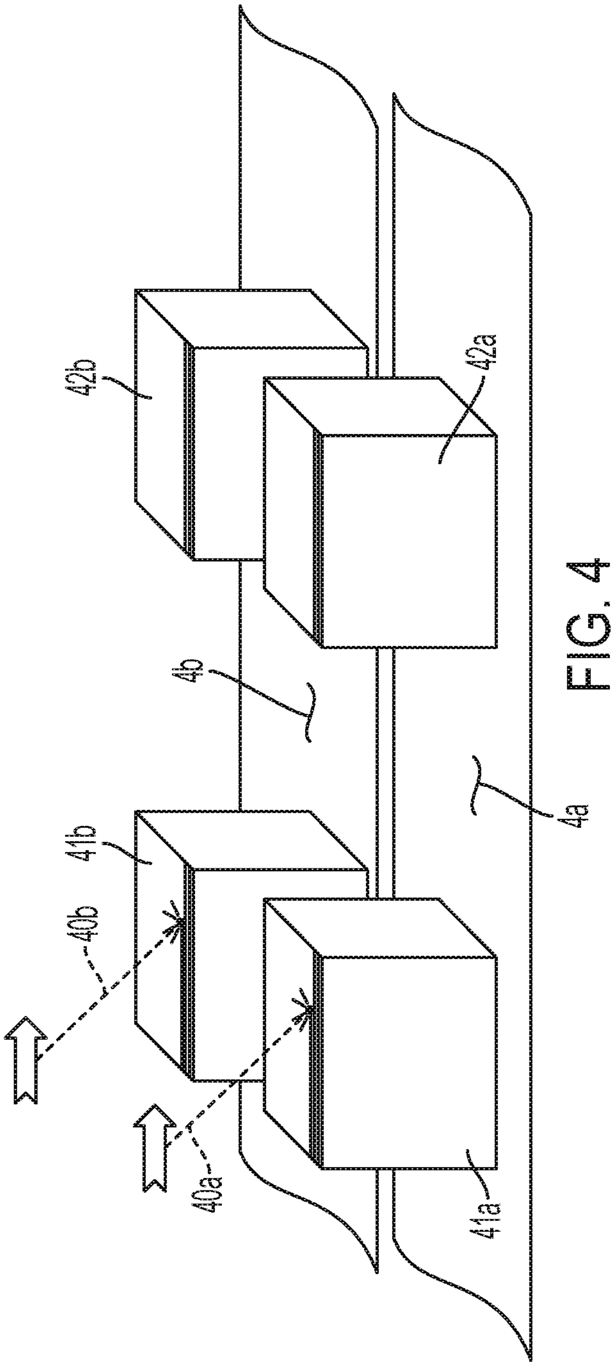

FIG. 4 shows two simultaneous additive manufacturing processes according to one illustrative embodiment. Each process corresponds to an individual build plate. Build plate 4*a* (front) includes partially complete parts 41*a* and 42*a*. Laser 40*a* which may be emitted by a corresponding first laser energy source is shown fusing part 41*a*. Build plate 4*b* (rear) includes partially complete parts 41*b* and 42*b*. Laser 40*b* which may be emitted by a corresponding second laser energy source is shown fusing part 41*b*. Each process may be the same as the single process illustrated in FIG. 3. In this case, the two processes are occurring exactly in sync with one another such that the lasers 40*a* and 40*b* turn on and off at the same instant. Lasers are shown at the same left-right position on their respective build plate at the instant captured. Here and in the related figures that follow, the first and second manufacturing systems including their respective lasers may be assumed to have the same performance and power demands as the other system. Similar to the above figure, FIG. 4 includes a plot of the total power from both simultaneously operating systems. The plot is shown above the parts and is sized and aligned to match the illustration of the manufacturing process. With both systems running and coordinated as shown such that the laser energy sources of each system are turned on and off at the same time, the total power may be P1' when the lasers energy sources emit the lasers to fuse material and may be P2" when the laser energy sources are off such that the systems are not fusing the material. The total power at any time is indicated by the solid line. The dashed line indicates the power of a single system, which is the same as illustrated for the single system case of FIG. 3. It can be seen that when the lasers are operating together the power spikes corresponding to laser on times are approximately double those when only a single system is operating, total power being additive between the two systems. Likewise, power P1' is higher than P1. All else equal, with only the manufacturing processes illustrated in FIG. 4 active, coordination as illustrated in FIG. 4 may not be desirable from the standpoint of reducing a maximum combined power during the combined operation of the illustrated processes.

Figure 5:
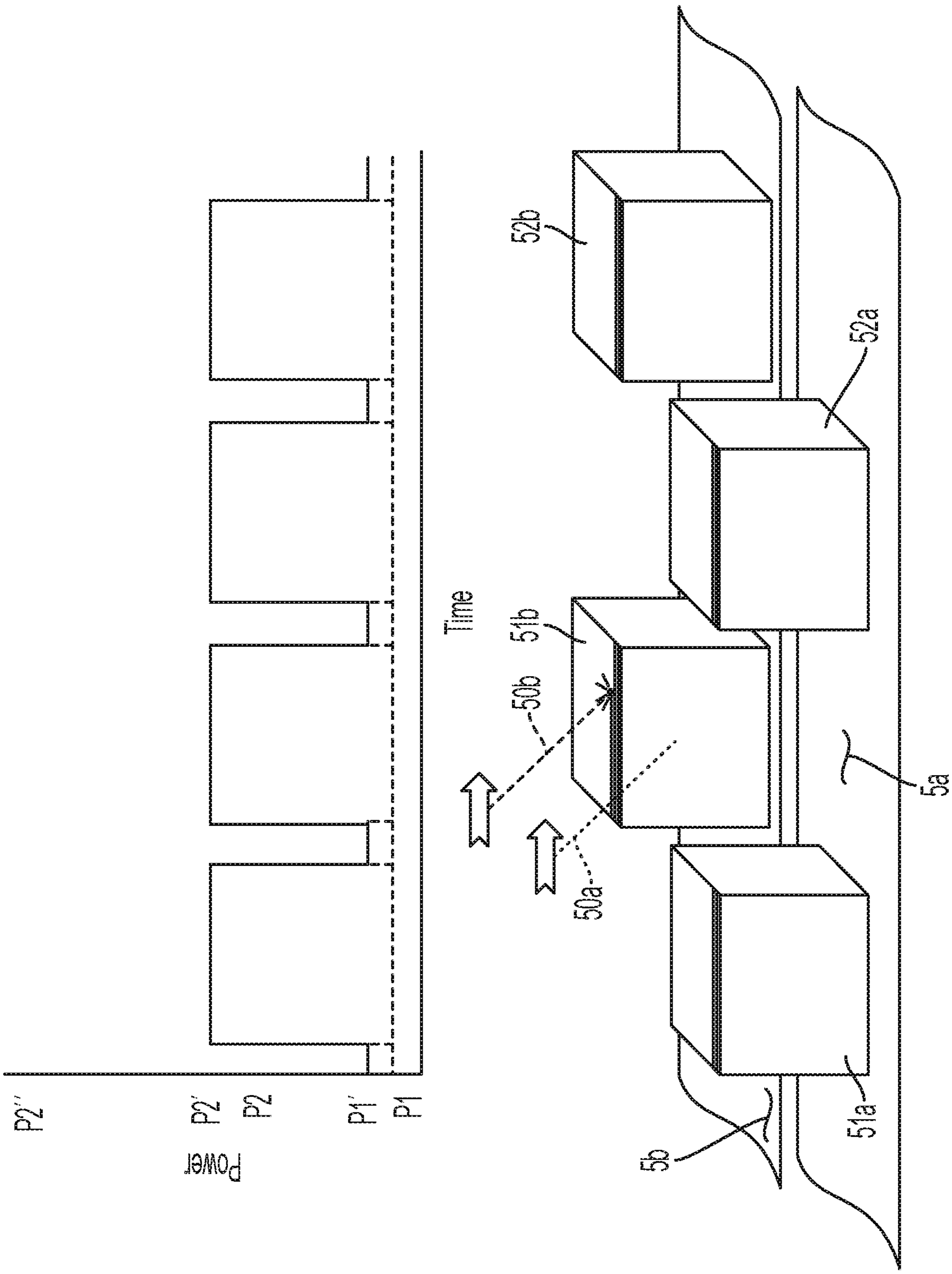
FIG. 5 shows two parts being manufactured by a third embodiment additive manufacturing system incorporating load balancing and accompanying power usage.

FIG. 5 illustrates an example of simultaneous manufacturing coordinated to reduce the maximum combined power during operation of multiple additive manufacturing systems. As in FIG. 4, two manufacturing processes occur simultaneously to produce four parts. Build plate 5*a* (front) includes partially complete parts 51*a* and 52*a*. Build plate 5*b* (rear) includes partially complete parts 51*b* and 52*b*. Laser 50*b* emitted by a first laser energy source is shown fusing part 51*b*. Laser 50*a* emitted by a second laser energy source is shown in a reduced power state which may be an off state. In the illustration the manufactured parts are staggered by staggering build plates 5*a* and 5*b* by offsetting one build plate by half of the part-to-part spacing. In the illustrated embodiment, this may result in part 51*b* receiving laser energy from 50*b* in between the times when parts 51*a* and 52*a* receive laser energy from laser 50*a*. It is not important whether this staggering occurs by offsetting the build plates (as shown) or by offsetting the travel of the lasers or any other appropriate method for appropriately synchronizing these high and low power modes of the different systems such that sequential high power modes and low power modes performed by each system may be coordinated to reduce a maximum combined power delivered to the systems during the build process. For example, as in the previous figures, a representative plot of the power use is provided above the illustration. The solid line represents the total power usage of both systems operating simultaneously and with coordination to reduce maximum combined power. Here P1' is the power usage when neither laser is fusing. Power P2' is observed when either laser 50*a* or 50*b* is separately fusing. In this figure, the lasers are not operated together at the same instant. P2' is greater than P2 by an amount equal in magnitude to P1 and representing the non-fusing power demand of the other manufacturing system not fusing at a given instant. P2' will be seen to be substantially less than P2" from FIG. 4 when both systems were fusing concurrently (P2' would be half P2" if not for the small power demand from the other system that is not currently fusing material).

The examples in FIGS. 4 and 5 illustrate additive manufacturing processes with an equivalent throughput, all else equal, both processes would produce four parts in approximately the same amount of time. The process illustrated in FIG. 5 achieves this equivalent throughput with a system combined power that is approximately half of that illustrated in the example of FIG. 4. Thus, coordinating power usage as illustrated in FIG. 5 may reduce the magnitude of a maximum combined power demand without reducing the throughput of the manufacturing process. Likewise for a given maximum available power, a greater throughput may be achieved by potentially allowing for a greater number of additive manufacturing systems to be operating simultaneously and/or at greater powers. It should also be appreciated that in the example of FIG. 5 there was no overlap in the periods of high power operation between the two systems as may occur in some embodiments. In other embodiments overlap of high power modes may occur, however there may be a benefit to reducing the duration of the overlap even if overlap occurs as this may still result in lower overall power demands as the number of systems increase. Additionally, in some embodiments, the power associated with the different systems may be reduced during overlapping high power modes to maintain a combined power of the systems below a desired power limit. It should also be appreciated that in some embodiments the plurality of build plates/additive manufacturing systems may be much greater than two, and that system timing coordination may reduce the magnitude and/or duration of overlapping high power modes between multiple systems even if such overlap is not entirely eliminated.

While the previous figures illustrated two additive manufacturing systems producing identical parts the same procedure may be used for any number of additive manufacturing systems making any number of identical and/or different part geometries. Coordination of the additive manufacturing systems may be performed by one or more controllers, which may include a centralized controller such as 230 in FIG. 2A, or distributed control using the controllers of the separate additive manufacturing systems as the disclosure is not so limited. The control system may be configured to control at least two manufacturing systems executing synchronous build plans. For build plans to be synchronous, a portion of the build time for the build plans may at least partially overlap so that the parts associated with a first build plan may be manufactured during at least a portion of the time that parts associated with the second build plan are being manufactured. For example, the first additive manufacturing system may execute a first build plan, which has a first power demand curve, with a first set of power peaks and a first set of power valleys. A second additive system may then execute a second build plan which may differ from the first build plan of the other system. The second build plan has a second power demand curve with a second set of power peaks and a second set of power valleys. The one or more controllers may then coordinate operation of the first additive manufacturing system and the second additive manufacturing system such that the first set of power peaks occur may be at least partially concurrent with the second set of power valleys and the second set of power peaks may be at least partially concurrent with the first set of power valleys. A similar process may be performed for any number of additive manufacturing systems, such as the n systems illustrated in FIG. 2B.

Figure 6:
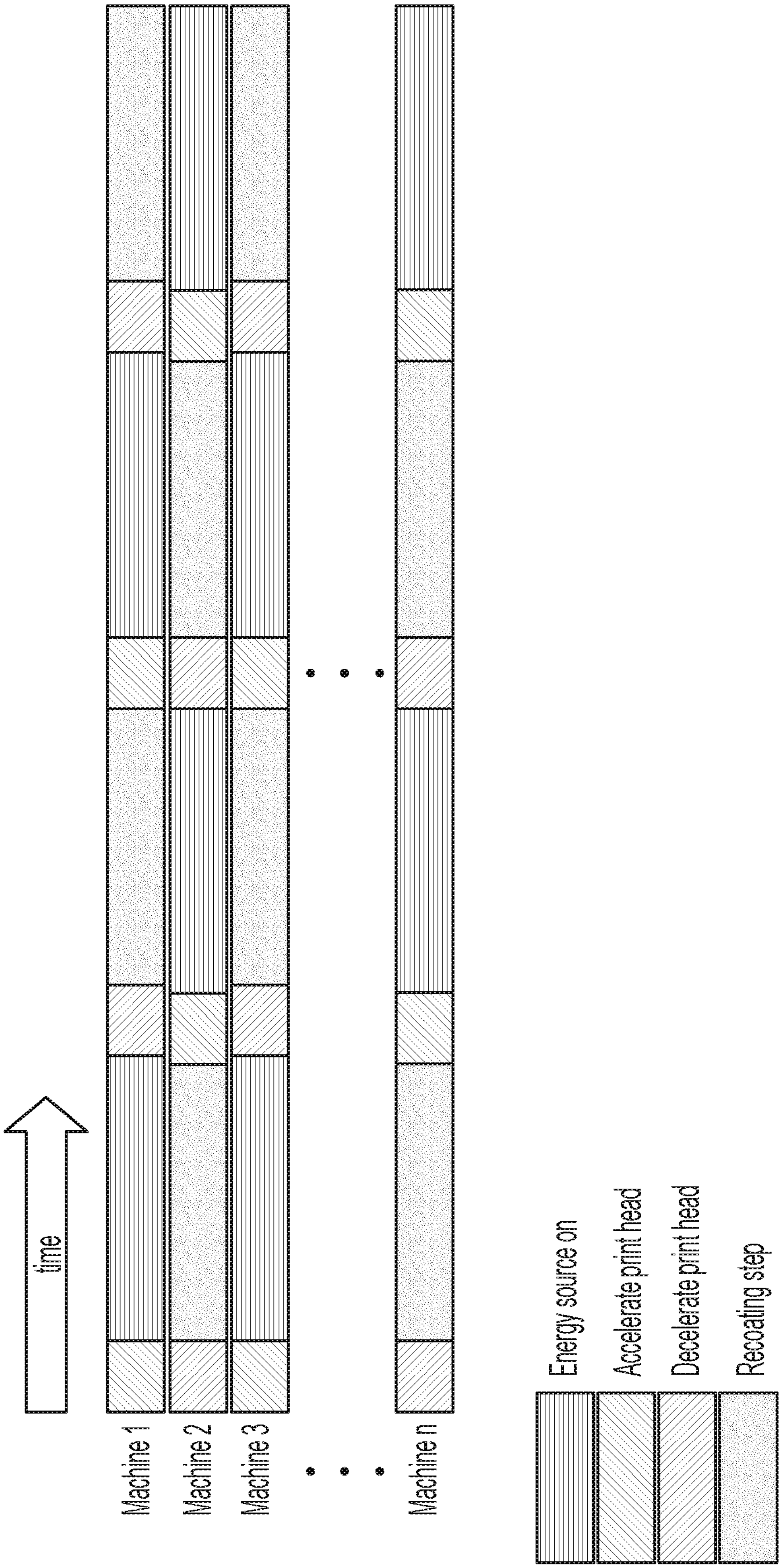
FIG. 6 shows a first schematic of power usage over time for n concurrent additive manufacturing processes according to some embodiments.
Figure 7:
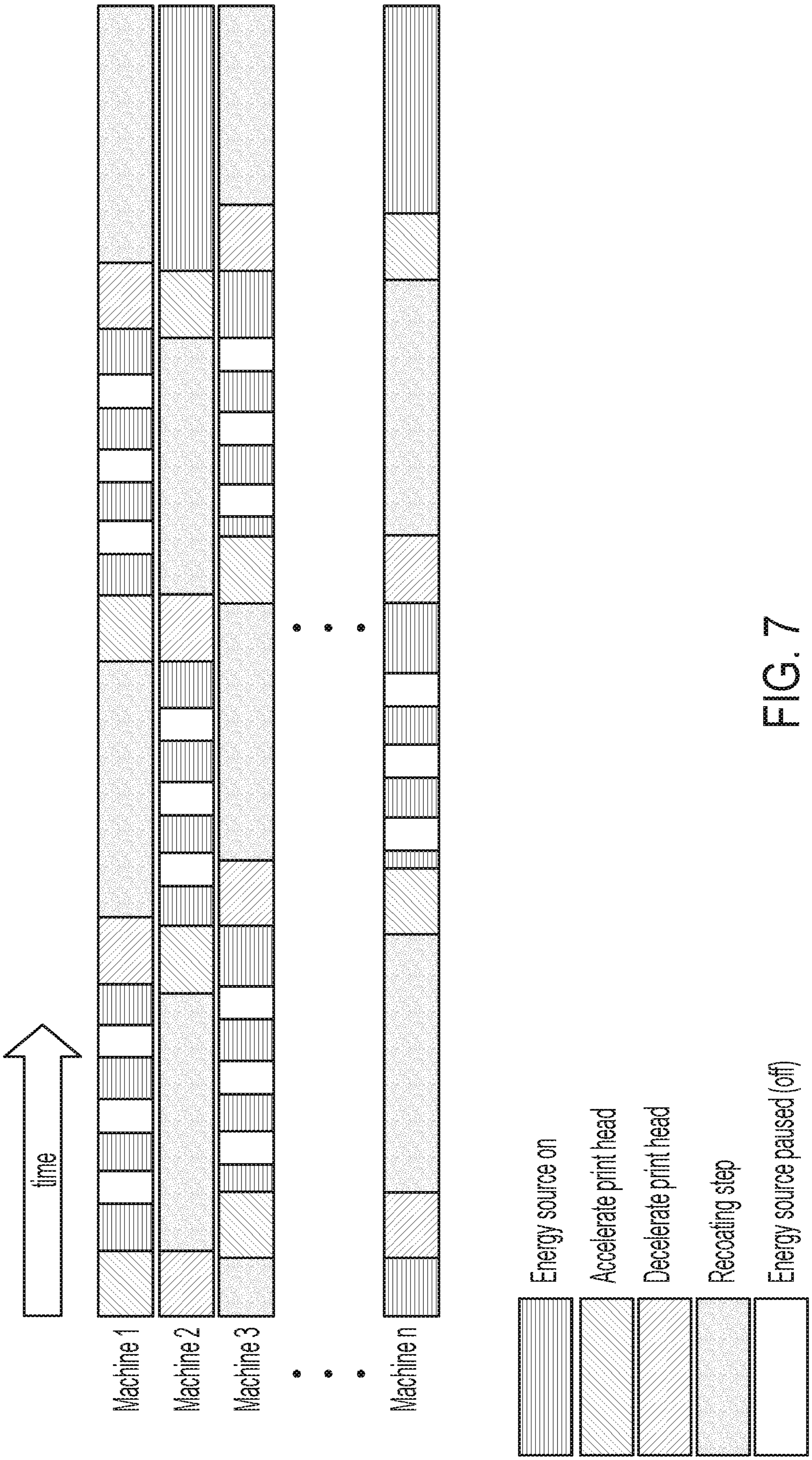
FIG. 7 shows a second schematic of power usage over time for n concurrent additive manufacturing processes according to some embodiments.

FIG. 6 illustrates a diagram showing additive manufacturing processes for a plurality of additive manufacturing systems that are coordinated to reduce maximum combined power according to one embodiment. The process described may be consistent with an embodiment of a powder bed fusion process wherein a powdered precursor material is spread over the build surface by a recoater during a recoating step. An optical assembly optically coupled to a plurality of laser energy sources may be accelerated and passed over the build surface. The laser energy sources are turned on to operate in a high power mode to fuse the powdered precursor material on the build surface in the pattern of a cross section of the part being formed according to of the build plan. The optical assembly may be decelerated after fusing a desired portion of the build layer, and the recoating step may be repeated to form the next layer. FIG. 7 shows n additive manufacturing processes simultaneously running on n build plates of n additive manufacturing systems. The number of additive manufacturing systems, n, may be any positive integer. As discussed earlier, the laser fusion steps may correspond the majority of the power demands in the manufacturing process. It may therefore be desirable to coordinate system timing to stagger the times when the lasers are active to reduce periods of high power demand. Referring to FIG. 7, it may be possible to extend any of the processes, especially the recoating processes, to stagger the times when the different laser energy sources are on. It may also be possible to reduce the laser power during the laser on time. If laser power is reduced, the optics assembly may be slowed accordingly to deliver an equivalent energy density to a given portion of the build surface (i.e., lower power applied for longer durations).

While similar duration on/off (i.e., high power modes and low power modes) times are shown for the energy sources in FIG. 6, different duration steps may also occur in additive manufacturing processes. For instance, the energy source on (fusing) steps may be much longer or much shorter than the recoating steps. Also, the relative length of the steps may differ between different systems. Coordinating the high power processes and low power processes so that there is at least some non-overlapping duration between different systems may help to reduce the overall maximum combined power over a defined time duration by reducing the number and/or duration of systems operating in a high power mode at the same time. The coordination of system timing may provide benefits even if perfect alignment of high and low power steps is not achieved. For example, in some embodiments, by coordinating the build plans such that at least one or more of the systems are operated in a lower power mode at any given instant, the overall combined power may be maintained desired below a desired threshold.

To help with coordinating the high and low power operating modes of the different systems, pauses may occur before during or after recoating steps as needed to coordinate staggered energy usage, such as by including delays between layers. In some cases, pausing laser sources may involve pausing the print head itself with the addition of attendant deceleration/deceleration steps.

The embodiment shown in FIG. 6 is somewhat simplistic where continuous high power cycles are shown during formation of a layer. However, energy sources may turn on and off throughout movement across a build surface to selectively fuse different portions of the build surface. For instance, in an additive manufacturing system including a plurality of laser sources, each of the laser energy sources may be turned off and on as the optics assembly moves the lasers across a build surface to fuse a desired pattern into the build surface. These on/off cycles of the separate laser energy sources within a single build layer are illustrated in FIG. 7 which is similar to FIG. 6. Additionally, as shown in FIG. 7, these on/off cycles of the energy sources of the different systems during formation of individual layers may also be treated as high power modes and low power modes that may be used to help reduce overall combined power consumption of the group of system. Specifically, the figure illustrates energy source on times for one system being coordinated to be performed at the same time as one or more energy source off times for another system during formation of a single layer. This may be done in addition to the other power management strategies discussed previously as well to reduce a maximum combined power of the group of systems during operation.

While the disclosed methods may be used with any number of systems and/or types of parts. It should be understood that in practice, some parts may not lend themselves to staggering and interlacing laser usage as cleanly as the periodic or nearly periodic examples in the illustrated examples. It should also be appreciated that in practice coordination may occur between a large number of manufacturing systems allowing for significantly increased opportunities for coordinating process steps. However, such coordination may still offer benefits with regards to reduced combined power demands. Additionally, other combined power reduction strategies may also be used in combination with, or as an alternative to, such a method. For example, as detailed further below, selection of part orientation may enable a degree of timing coordination that might not otherwise be available.

Combined power demand between multiple additive manufacturing systems may be reduced by selection of part orientation to reduce maximum energy consumption associated with formation of the plurality of layers during a manufacturing process. Specifically, by selecting orientations of one or more parts being formed synchronously with one another on one or more build plates, the maximum time a system is operating in a high power mode to fuse a precursor material for any given layer may be reduced. This may reduce the probability of any two additive manufacturing systems operating in a high power mode at the same time which may help to reduce combined power demands for a group of additive manufacturing systems. Specific examples of this concept are elaborated on further below. Such control may also help facilitate opportunities for timing coordination between the different systems.

Figure 8A:
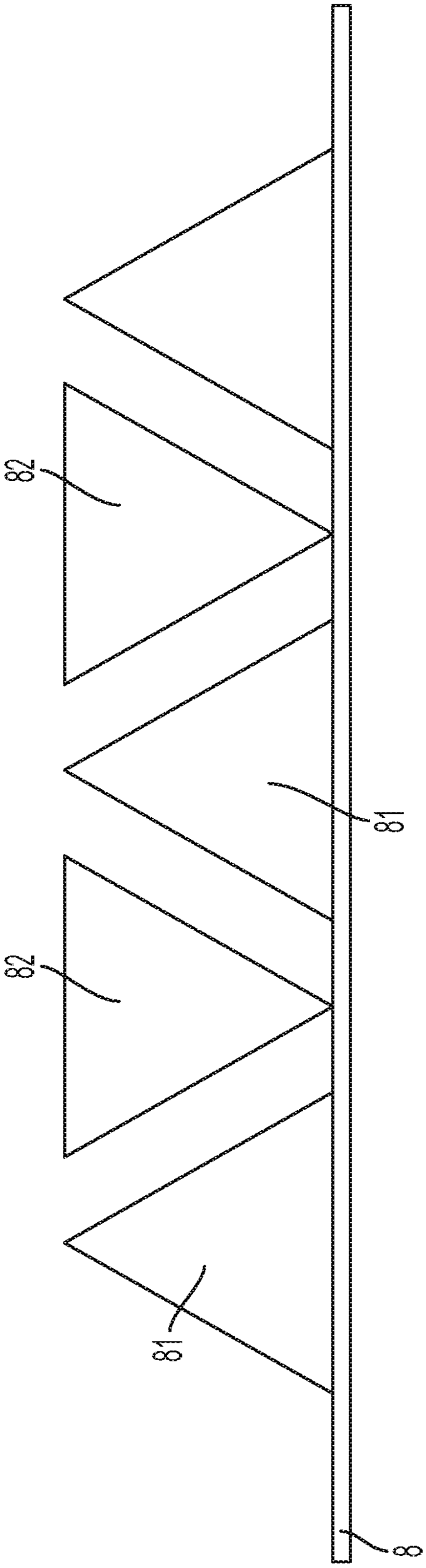
FIG. 8A shows a schematic representation of parts oriented on a build plate of an additive manufacturing system according to some embodiments.

FIG. 8A illustrates a representation of parts oriented on a single build plate in an orientation that provides provide even energy consumption between the different build layers of the parts which may be correlated with part areas in each layer. Triangular prisms 81 and 82 are manufactured on build plate 8. The "up" triangles 81 and the "down" triangles 82 may be identical except for their orientation for illustrative purposes. A slice through any horizontal plane parallel to the single build plate will give approximately equal combined part cross sectional areas for the different parts. This would result in approximately equal energy consumption during formation of the different layers. This example is offered for conceptual illustration only, in particular there are disadvantages to building the "down" triangles 82 as illustrated. For example, part scaffolding may be needed in some embodiments to form reentrant, inward facing, or overhanging structures using additive manufacturing methods.

As noted above in some embodiments, the use of scaffolding to support one or more portions of the parts being printed may be desired. For example, scaffolding 89*c* may be included in the embodiment of FIG. 8C to support the parts corresponding to triangular prisms 82*c*. Similar scaffolding may also be used in the embodiment of FIG. 8A, but is not illustrated for clarity reasons. It should be understood that depending on the geometry and orientation of a part, scaffolding may result in poor surface quality on the downward facing surfaces the scaffolding is attached to. Additionally, scaffolding may be difficult to remove or may cause parts to be difficult to remove from the build plate and/or each other. Therefore, surface finish and manufacturability considerations may be taken into account when using scaffolding during the manufacture of parts oriented in different orientations.

Figure 8B:
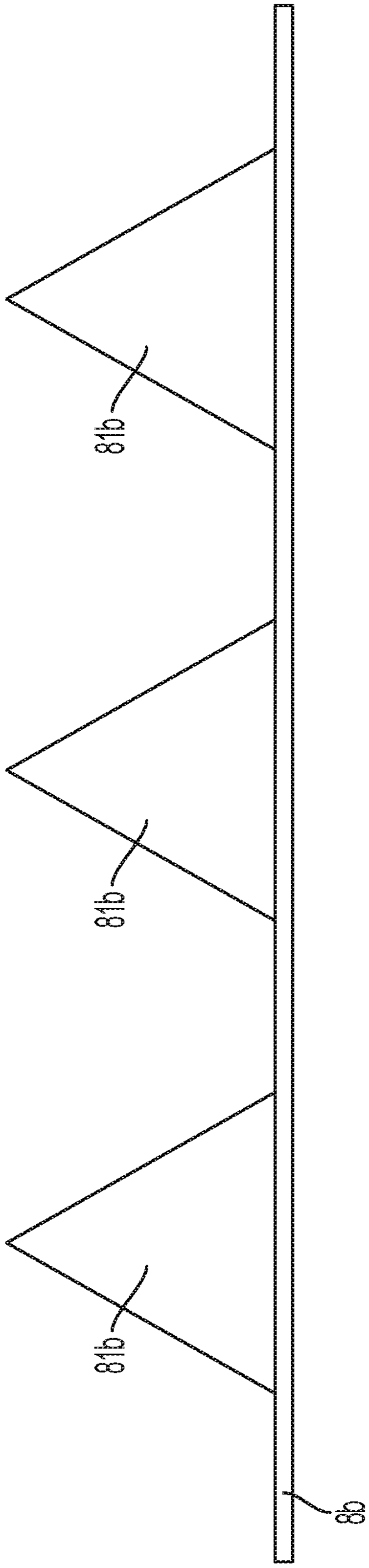
FIG. 8B shows a schematic representation of parts oriented on a build plate of an additive manufacturing system according to some embodiments, the parts may be manufactured simultaneous to those shown in FIG. 8C in some embodiments.
Figure 8C:
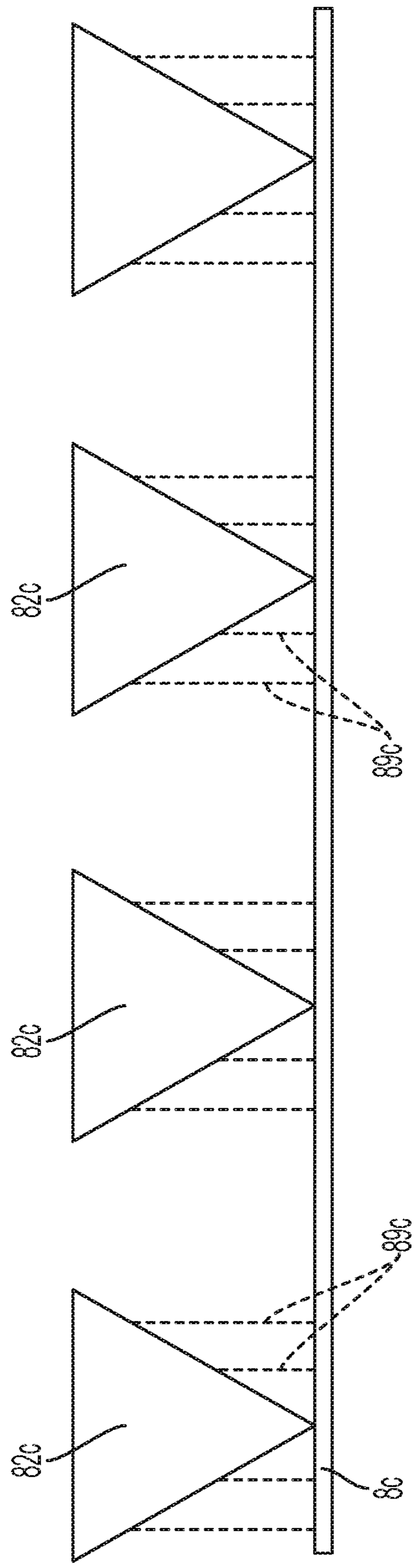
FIG. 8C shows a schematic representation of parts oriented on a build plate of an additive manufacturing system according to some embodiments, the parts may be manufactured simultaneous to those shown in FIG. 8B in some embodiments.

FIGS. 8B and 8C represent one embodiment of a way of orienting parts on separate build plates to achieve the benefits previously described relative to FIG. 8A on a single build plate. Turning first to FIG. 8B, upward facing triangular prisms 81*b*, or other parts, may be built on build plate 8*b* in a first orientation. In FIG. 8C, downward facing triangles 82*c*, or other parts which may be similar in overall size and shape to those on the first build plate, may be built on a separate build plate 8*c* in a second orientation that is different than the first orientation. Due to the downward orientation, scaffolding 89*c* may be used to support the triangular prisms while they are being formed. The maximum combined areas in the build layers being fused at a given time may be reduced which may reduce the maximum on time, or high power operating modes, for the energy sources included in the different systems during the synchronous formation of a given layer of each set of parts. Further, if the build plates shown in FIGS. 8B and 8C are manufactured simultaneously, as in the manner of FIG. 5, the fusing of the "up" triangles on plate 8*b* may be coordinated to fall into times when the system of build plate 8*c* is in between down triangles, and thus not fusing material, and vice versa. It should be appreciated that forming parts in this way is incorporating both part orientation and coordination of system timing may permit a synergistic effect to reduce the maximum combined power observed during operation of the systems. This power reduction effect would be expected to be more significant for larger numbers of systems operating at the same time using the disclosed methods.

Figure 8D:
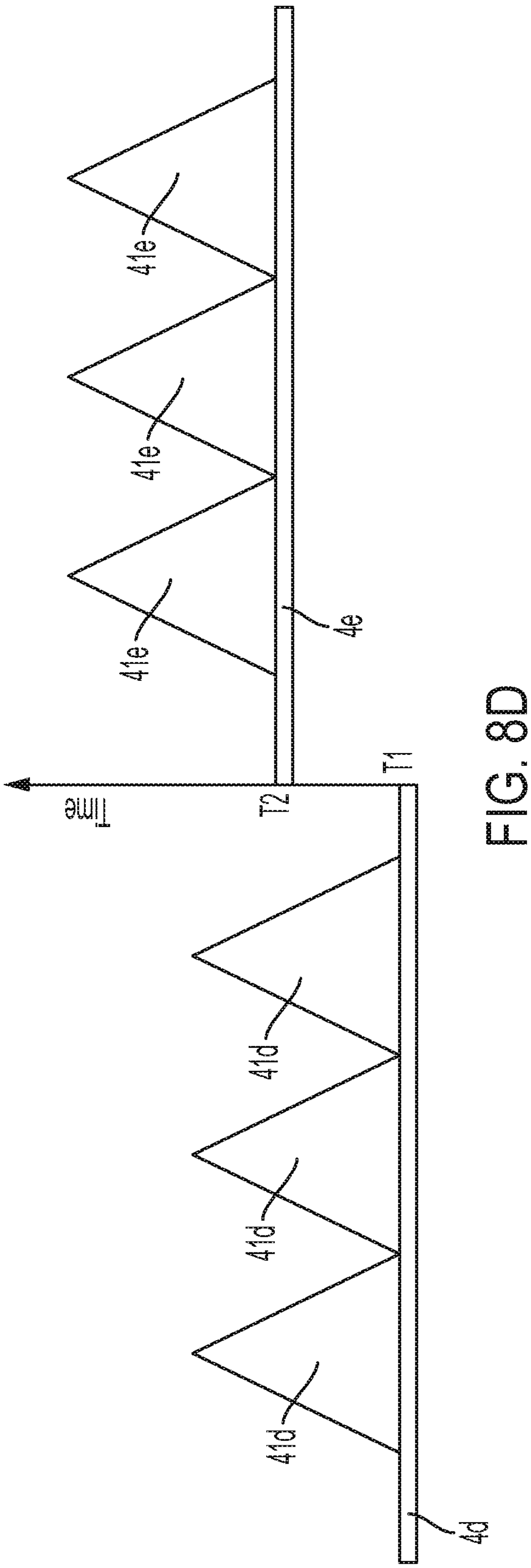
FIG. 8D shows a schematic representation of parts oriented on two build plates of an additive manufacturing system according to some embodiments, the timing of the two build plates being offset from each other.

FIG. 8D illustrates two sets of parts on two separate build plates but in a single orientation. In the depicted embodiment, the formation of the parts on the different build plates are offset in time. For example, one group of parts, upward triangles 81*d* are formed on build plate 8*d*. A second group of parts, triangles 81*e* are formed on build plate 8*e*. All parts may be identical except for the build plate on which they are formed. The formation process on build plates 8*d* and 8*e* may be offset in timing (e.g., started at different times), as indicated by the vertical time axis in the figure. Specifically, build plate 8*d* begins manufacture at time T1 while build plate 8*e* begins manufacture at time T2. In this case the part geometry lends itself to the additive manufacturing system being in a high power mode for a smaller portion of the time during layer formation towards an end of a part formation process. Therefore, timing coordination may be used to allow the triangles of 8*e* to mostly fall in between the triangles of 8*d*. Additional timing coordination, such as for instance building in pauses or slowed recoater steps into the manufacturing process of either build plate 8*d*, may allow both build plates to be formed without overlap of laser on times between build plates. Though instances in which different part geometries are used and/or partial overlap of the high power modes between two or more systems of a group of systems occurs are also contemplated.

Figure 9:
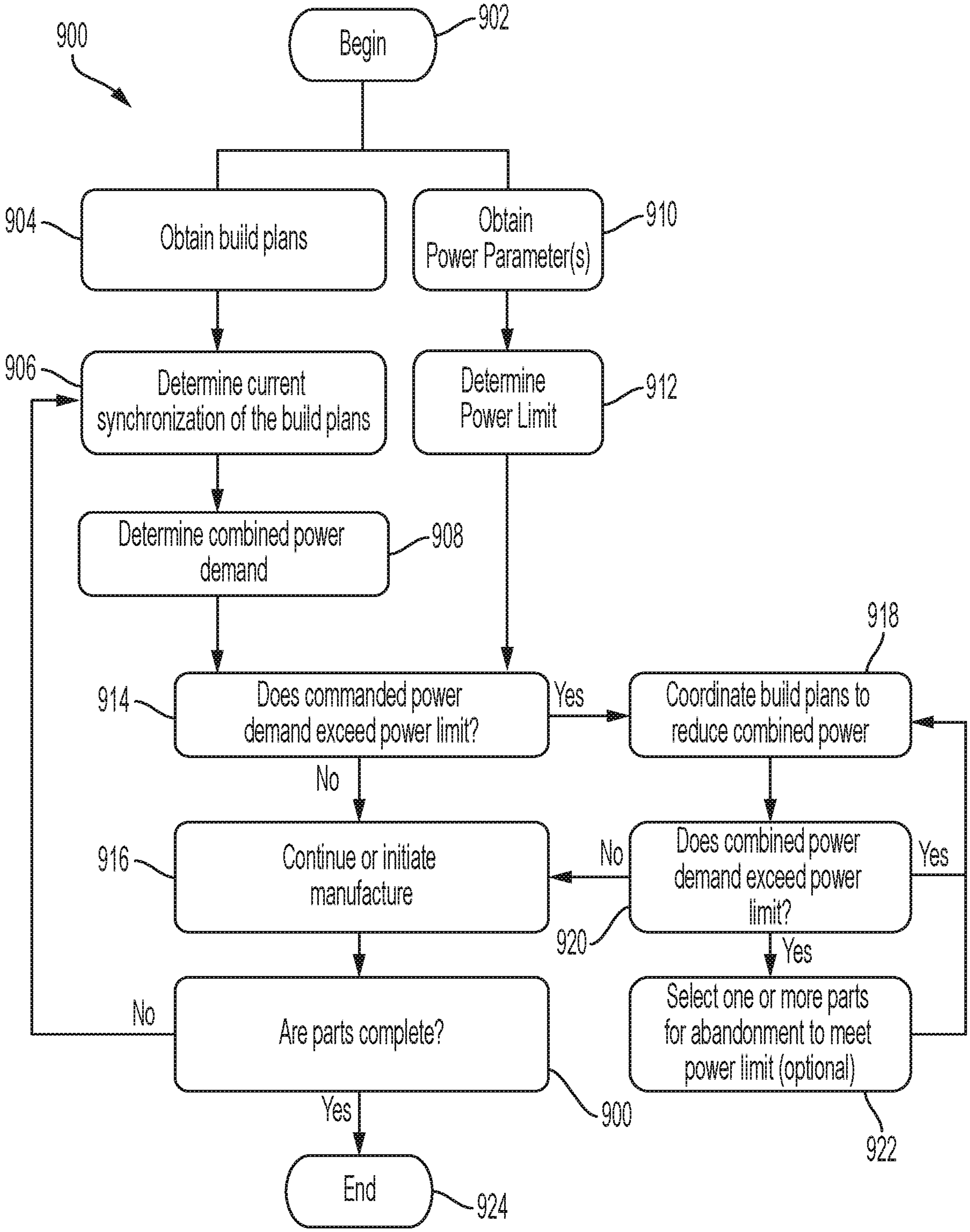
FIG. 9 shows a flow diagram of one embodiment of a power balancing method for additive manufacturing.

FIG. 9 shows a flow diagram of a method 900 for coordinating system operation between a plurality of additive manufacturing systems to maintain a combined power usage for the plurality of additive manufacturing systems below a desired power limit according to one embodiment. The method may start at 902. Build plans for parts to be manufactured may be obtained at 904. This may correspond to the build plans being generated, recalled from associated computer memory, or being obtained in any other appropriate manner for the separate additive manufacturing systems. In instances in which the build plans are generated, any appropriate build plan generating methods may be used including, for example, any appropriate slicing and/or path planning algorithms used to generate build plans for an additive manufacturing system.

Depending on the embodiment, and as noted previously above, the build plans may include a plurality of sequential layers to be formed where each layer includes a weld pattern to be formed by the one or more energy sources of the associated additive manufacturing system as well as the associated build parameters associated with the formation of the desired weld patterns. For example, the build plans may also include build parameters such as timing, power, print speed, recoating speed, pause times between layers, and/or other build parameters. In some embodiments, one or more of these parameters may include an acceptable range for use during a build process. Thus, one or more build parameters of one or more of the build plans may be adjusted either prior to and/or during operation of the plurality of additive manufacturing systems to coordinate their operation and provide a reduced maximum combined power usage by the group of systems as elaborated on further below.

In some embodiments, the build plans may include parts with different geometries and/or orientations as previously described above. The use of different part positioning and/or orientation as part of the generation and use of these build plans to help control a combined power usage of the plurality of additive manufacturing systems with the depicted method is contemplated and is elaborated on further below with regards to FIGS. 10-11. In instances in which these two methods are combined, this process may be performed as part of step 904 or as a separate step prior to step 904.

At 906 a current synchronization of the different build plans for use by the different additive manufacturing systems may be determined. In embodiments in which none of the build plans are currently being performed, this may include setting a start time for each build plan. For example, a start time may initially be set to be the same and/or two or more of the build plans may have staggered start times similar to the embodiment described above relative to FIG. 8D. However, in some instances, one or more of the build plans may already be in use by one or more additive manufacturing systems for building corresponding parts (i.e., one or more additive manufacturing systems already be forming one or more parts). In such an embodiment, the initial synchronization may correspond to determining an initial start time for the build plans that are not currently in use relative to a timing of the build plans that are currently in use. In still yet another embodiment, the various build plans may already be in use and determining the current synchronization of the different build plans may include determining a currently commanded timing for each of the build plans (e.g., what portion of the build plan is currently being performed) relative to each other for the different additive manufacturing systems. Depending on the embodiment, this initial synchronization may either be performed once when the systems are initially started, at periodic predetermined intervals, and/or when operation of one or more additional manufacturing systems is to be started.

Once the current synchronization (i.e., timing) of the different build plans relative to each other is determined at 906, the commanded power demand over time may be determined at 912. For example, a power usage of each build plan versus time may either be included in the different build plans and/or may be determined based at least partly on the different commanded actions and timings in each build plan (e.g., high power modes corresponding to material fusing and lower power modes corresponding to recoating, movement, and/or other operations). The anticipated power demands of the separate build plans, and thus correspondingly the separate additive manufacturing systems, may be summed together to provide a combined power demand of plurality of additive manufacturing systems during operation. Depending on the embodiment, this combined power demand may be determined for any desired duration. For example, in some embodiments, this may be determined for either a portion of a duration of the build plans and/or for the entirety of the duration of the build plans as the disclosure is not limited in this fashion.

In some embodiments, one or more power parameters, which may include the available power, cost of power, and/or other appropriate power parameters as disclosed herein may be obtained at 908. The power parameters may either be manually input, predetermined parameters recalled from associated computer readable memory, provided by one or more associated systems (e.g., available power, power cost, or other parameter), and/or obtained in any other appropriate manner. Once the power parameters are obtained, a power limit for the group of additive manufacturing systems may be determined at 912 based at least in part on the one or more power parameters. In some embodiments, the one or more power parameter may include at least one of a maximum available power and a current cost of power. In some embodiments the power limit may be set equal to the maximum available power, which may include an appropriate safety factor, such as for instance during periods of low power cost. In one such embodiment, the power limit is less than or equal to a power capacity of a power distribution system connected to the plurality of additive manufacturing systems. In other embodiments, the power limit may be set below the maximum available power due to other considerations, such as for instance the maximum power limit may be reduced based on the power cost exceeding a threshold cost. For instance, a minimum power usage may be used for continuing an additive manufacturing process within an acceptable range of build parameters (e.g., a maximum pause time between layers, minimum recoating speed, minimum energy source power, minimum scan speed, etc.) to until a period of high power cost may finish and the power cost may decrease to below a predetermined threshold. In some embodiments a power limit may be set to maintain or maximize profitability based on parameters such as the cost of power, the value of the parts being manufactured, and an opportunity cost associated with delaying or extending the build time for a group of parts. Depending on the embodiment, the power limit may be determined during initial synchronization, during each iteration of the coordination method, at predetermined periodic intervals, upon a triggering event occurring (e.g., a change in one or more power parameters), manufacturing milestones occurring (e.g., the completion of one build plates), and/or at any other appropriate time.

Once the combined commanded power and power limit have been determined, the combined commanded power may be compared to the power limit at 914 to determine if the current build plans will exceed the power limit at one or more time points during performance of the build plans. This comparison step may be repeated at specific predetermined time intervals such as every second, every minute, every hour, and/or any other interval, or it may be performed in response to an observed change, such as a change to the power limit. The power limit check may be anticipatory and may consider if the current power limit would be exceeded by the combined power demand of the different processes anticipated to be performed by the plurality of additive manufacturing systems during the next time interval. This comparison may be done in any appropriate manner. For example, the power limit may be compared to the combined commanded power demand at each desired time point; a maximum combined power demand for the evaluated time period may be compared to the power limit; combinations of the foregoing may be done; and/or any other appropriate comparison to determine if the power limit may be exceeded over a time period may be conducted as the disclosure is not so limited. In some embodiments, the power comparison may be evaluated for a time period that is greater than the time period between comparisons which may help to avoid unanticipated combined powers of the plurality of additive manufacturing systems exceeding the commanded power limit between these comparisons. The power limit may be compared to future power limits. (i.e., a power limit which may be imposed by an electrical supplier may not be a constant over the hours, days, or other duration of a print being evaluated). The power limit may also be a function of electrical servicing work being performed at or near the site disabling a sub-set of distribution that are used for shared/redundant power.

If it is determined that the power limit is not anticipated to be exceeded over the evaluated timer period, manufacture of the different build plans using the plurality of additive manufacturing systems may continue at step 916. In instances where the build plans are not currently being executed, this may correspond to initiating manufacture of the different build plans. However, if it is determined that the power limit may be exceeded, the method may continue to step 918 where the plurality of build plans may be coordinated to reduce the commanded combined power.

For example, the build plans and the power parameters may be provided to a coordination module at 918 which may be configured to determine and evaluate the power usage of the systems during operation and to coordinate the operation of the systems to provide the reduced combined power usage during synchronous execution of the different manufacturing processes. This coordination module may be run continuously as a loop or performed, at certain predetermined intervals, and/or or in response to certain triggering events such as a change in available power, the cost of power, or other appropriate triggering event. Additionally, the coordination module may either be performed by a single central controller that coordinates operation of the separate additive manufacturing systems and/or the coordination module may be performed using a distributed process by the different additive manufacturing systems as the disclosure is not so limited.

Within the coordination module performed at 918, the at least one controller may adjust the timing (e.g., start times, pauses, and other timing based parameters), scan rate, fusing power of one or more energy sources, and/or any other appropriate build parameter that may affect either a timing and/or magnitude of high power demands and low power demands associated with a plurality of build plans to be executed by a corresponding plurality of additive manufacturing systems. Again, these build plans may be coordinated to maintain a sum of power consumed by the plurality of additive manufacturing systems below the power limit. For example, if the power reduction and/or delay associated with changing one or more build parameters associated with a particular build plan is within an acceptable build parameter range for a particular build process, it may be possible to shift one or more periods of low power mode operation for a first additive manufacturing system and first build plan to at least partially overlap with, and in some embodiments, completely overlap with periods of high power mode operation by a second additive manufacturing system and second build plan. This type of coordination may be done for the plurality of additive manufacturing systems over either portion of duration of the build processes to be performed or over the entire duration of the build processes to be performed as the disclosure is not so limited.

Build plans and/or orientations may be coordinated by various appropriate methods or algorithms to provide a desired amount of reduction in a maximum combined power demand of the additive manufacturing systems implanting build processes with these build plans. It should be noted that the algorithms used to coordinate part orientations or to synchronize additive manufacturing systems may not be optimizations in that the synchronizations identified may not represent ideal or best case solutions but instead provide workable solutions at a reasonable computing effort. In some cases benefits from identifying "better" solutions may be negated by the time or computational effort relative to an alternate acceptable solution. Some potential methods are described as follows. Brute force methods involve iterating through the acceptable range of all variables to locate a lowest obtained and/or acceptable solution exhibiting a reduced maximum combined power. Brute force methods may be computationally expensive. In such an embodiment, finite step sizes for iterating the various parameters may be used. However, the number of potential states to analyze could easily reach into the millions or higher. In places where brute force may be used, an algorithm may stop when one of an acceptable range of solutions is encountered (e.g., a set number of iterations is performed, a threshold reduction in maximum combined power is obtained, etc.). Monte Carlo methods share some commonality with brute force solutions but with potentially lower computational expense. A number of orientation configurations may be selected (for instance, 100, 1000, 10,000 or more unique configurations) at random values within an acceptable range for each variable. Out of the configurations tested, the best performing configuration may be used presuming it meets a power limit requirement. If the Monte Carlo procedure does not identify an acceptable solution, the process may be repeated or an alternate method/algorithm may be selected. In other embodiments, a greedy algorithm may be used to identify coordinated orientation. Greedy algorithms work by taking a decision path that selects an optimum option at each decision step in a decision-making process. Such algorithms may be more computationally efficient than brute force methods, although the resulting solution may not approach a global minimum or optimum solution. Combinations of the above methods may be employed, for instance by identifying gross orientations with Monte Carlo techniques, and refining those with some combination of brute force and/or a greedy algorithm. Any ordering of the methods may be contemplated. In view of the above, any appropriate method of coordinating the operation of multiple build plans and/or for identifying orientations of parts to reduce a maximum combined power of the build plans during operation may be used as the disclosure is not so limited. Additionally, the references to parameters, solutions, configurations, and similar terms should be understood to refer to any appropriate combination of build parameters as disclosed herein for coordinating the build plans.

After an initial iteration of coordinating the build plans to reduce the combined power, the combined power may again be determined and compared to the power limit at 920 in a manner similar to that described above. In some embodiments, if the power limit is still exceeded the coordination step 918 may be performed either until the power limit is not exceeded after which the method may continue with manufacture of the build plans at 916, or it may continue for a predetermined number of iterations and/or until lower combined power configurations for the build plans cannot be identified. In these instances in which the power limit is still exceeded and cannot be reduced further with the current build plans, additional actions may be taken as elaborated on further below.

If a sufficient power reduction or permissible delay cannot be found to avoid exceeding a set power limit, one or more parts may be selected for abandonment at 922 as no longer producing one or more parts among the plurality of build plans would correspondingly lower the power requirements for those build plans. Abandonment prioritization may be based at least in part on measured part quality (e.g., the presence of part defects in the one or more parts to be abandoned), the value or sale price of parts (e.g., low value parts may be abandoned before high value parts), the resources already expended on a part and/or the time remaining for a part (e.g., a part earlier in a build process may be abandoned before a part closer to being finished), the operational health of the additive manufacturing system (e.g., systems exhibiting more faults may be prioritized to be abandoned before fully functional systems), the availability to reschedule parts into future builds, and/or any other appropriate part prioritization parameters. In some specific embodiments, the part prioritization parameters may include a part value; resources already expended on a part; and/or part quality.

As part of step 922, an additive manufacturing system may include sensors configured to monitor various parameters of the part or parts being formed that may be used to identify likely part defects. The sensor data may be used for reasons including to repair part defects, to adjust manufacturing parameters, and to identify parts which already contain defects that would render such a part unusable. Part quality checks may be performed continuously and/or at the predetermined time intervals at a timescale less than the repetition of the coordination process described herein. Appropriate sensors may include weld sensors such as cameras, tactile sensors, measurement devices such as laser micrometers or other appropriate sensors. Defects may include weld defects, voids, high spots, contamination, dimensional variation, warpage, and other types of defects.

After one or more parts have been selected for abandonment, they may be removed from the associated one or more build plans of the plurality of build plans and the power coordination 918, power comparison steps 920, and optionally additional part abandonment at 922 may be continued until the combined power does not exceed the power limit at which point the systems may continue with the build processes at 916 using the modified plurality of build plans.

In some embodiments, parts may be prioritized within a single build plate and/or within the plurality of additive manufacturing systems. For example, it has already been noted that defective parts may be identified and abandoned within a build. Doing so would modify the build plan to remove the abandoned part but may not require abandoning other parts that may be on the same build plate. Parts may also be prioritized for formation with different powers, for instance, some parts may be formed at a lower laser power while this may be prohibited for other parts, the different parts being manufactured with different laser powers. In extreme cases some otherwise acceptable parts within a build plate may be abandoned to prioritize continued manufacture of other parts. Criteria for deciding to prioritize individual parts within a build plate/build layer may include the individual values of the separate parts on the build plate, the manufacturing requirements for the individual parts on the build plate and the resources expended on the individual parts on the build plate. Part prioritization may occur on the build plate level a single additive manufacturing system is running or in an additive manufacturing system within a group of simultaneously operational additive manufacturing systems.

In some embodiments, individual parts and/or entire build plates may be prioritized be a weighting system during a simultaneous manufacturing process. During manufacture, at least one controller establishes a power limit for the group of additive manufacturing systems 900. Power must then be allocated between systems comprised in the group. One or more controllers may allocate the power to each system based on the processes being performed by each system, with the power level to each system subject to continuous adjustment to balance the needs of all systems subject to the maximum power limit. The weighting system may assign a weight to individual parts being manufactured or to individual build plates which may contain a plurality of parts. Parts or build plates with higher ratings may receive a greater power allocation and those with lower weightings may receive a lower allocation and are more likely to have their build plans modified to reduce power. Lower weighted parts or build plates may be abandoned before higher weighted parts or build plates. In embodiments where weightings are applied at the build plate level, individual manufacturing systems may further prioritize parts within each build plate accordingly as previously described.

One or more controllers may weight parts or build plates within a group of simultaneously running manufacturing processes based in part on one or more part prioritization parameters that may include: the instantaneous power limit for the group of manufacturing systems, the value of a part or build plate of parts being built by the additive manufacturing system, resources already expended on a part or build plate being built by the additive manufacturing system, the time remaining to completion of a part or build plate, a deadline for completion of a part or parts being built by the additive manufacturing system, quality requirements for a part or parts being built by an additive manufacturing system, measurements of part build quality or manufacturing defects, data describing the operational health of the additive manufacturing systems within the group, historical performance data for a particular manufacturing system or for a particular part being built, the power requirements of build layers (determined by part geometry and orientation). It should be appreciated that the value of the parts manufactured may itself be a time dependent value based on delivery incentives, penalties, or market conditions. In as much as the power limit affects the availability and therefore the distribution of power, parameters that affect the power limit indirectly affect the distribution of power as well. Those factors may include: an instantaneous price of power, imposed power usage restrictions, and value of incentives offered to reduce power consumption during periods of high power demand.

Additive manufacturing systems or groups of additive manufacturing systems may have system efficiency points where operation may be more power efficient on an absolute basis or on the basis of cost of goods manufactured. All else equal, it may be better to operate at such system efficiency points. System efficiency points may affect the weighting of a part or build plate or otherwise be utilized in the allocation of power between machines. Likewise, there may be inefficiencies, such as for instance a build plate that is underutilized. Points of inefficiency may also affect power allocation.

Other embodiments are contemplated that may allocate power between additive manufacturing systems in other ways. In one embodiment, individual additive manufacturing systems could establish a "market" for power within the group of simultaneously running additive manufacturing systems. Systems may then bid for power resources based on their needs and anticipated productivity. Likewise, individual systems could trade between power and time to balance power demand versus availability within the group of manufacturing systems.

For instance, a facility including a plurality of additive manufacturing systems may operate as its own marketplace and applying principles of microeconomics. A facility with N additive manufacturing systems may allow individual systems or individual parts to bid on electricity within the facility. The "price" of electricity rises as usage approaches the capacity of the facility and drops when surplus power is available. "Price" in the context of a bidding algorithm may not be the same as the cost to purchase power from the utility. Individual additive manufacturing systems bid for power based upon their own judgement if it is profitable to make the parts they are forming. The bidding algorithm may additionally account for manufacturing deadlines, future schedules (i.e., will the system be available tomorrow night), forecast future price of power, and other factors. The result may be to delay low profit parts until times of lower energy cost such as when future machine availability permits.

Utilities may have different power cost for electricity based on time of day or extreme grid events. In some cases, utilities may compensate users to reduce power demand. These external prices may factor into profitability of a print. Systems may select to idle or slow down one or more prints until electricity costs are better or the supply is more stable. An algorithm may select to receive compensation to delay a print in some cases.

The manufacturing process at 916 as well as the synchronization, comparison and coordination steps may be continued until the parts are complete at which point the process may end at 924. For example, if part formation is not complete, the overall method may undergo another iteration of a loop may be conducted starting at determining the current synchronization. It should also be understood while a single end point is shown, not all manufacturing processes will conclude at or even near the same time and new build plans associated with new additive manufacturing systems may be added to the group of already running systems at any time. Additionally, in instances where coordinated build plans are generated prior to initiation of the manufacturing processes, the build plans may be stored in non-transitory computer readable memory for subsequent recall and use. In either case, the disclosed method is not limited to when any of the various additive manufacturing systems start or end a build process.

With regards to the above method, certain parts being manufactured may have specific process requirements, including parameters such as laser power or time between layers. Such parameters may be in place for consistency of material properties, for purposes of thermal/residual stresses, part quality (i.e., avoiding formation of part defects), and/or other reasons. Parts with certain processing requirements may not be suitable for reduced laser power and/or delayed manufacturing steps. Thus, build plan coordination may alter or delay the build plans for other build plans when one or more of the build plans include a more limited range of permissible process parameters.

A group of coordinated additive manufacturing systems may include systems with different build times. As noted previously, simultaneous manufacturing processes are not required to start or conclude at the same time. This may mean that some simultaneous processes conclude, and others begin during the time that the coordinated processes are running. Manufacturing systems may be coordinated in some embodiments so that the start time of a new build may be delayed until another power intensive process has finished. Likewise, the number of active additive manufacturing systems may be increased during periods of high power availability and allowed to naturally decrease as they conclude prior to periods of lower availability occurring. In some embodiments, anticipated build time may be used as a criterion for synchronizing when a build should begin. For example, anticipated build times and power availability may be considered with appropriate weightings when deciding on when to begin a build process during a coordination step.

Figure 10:
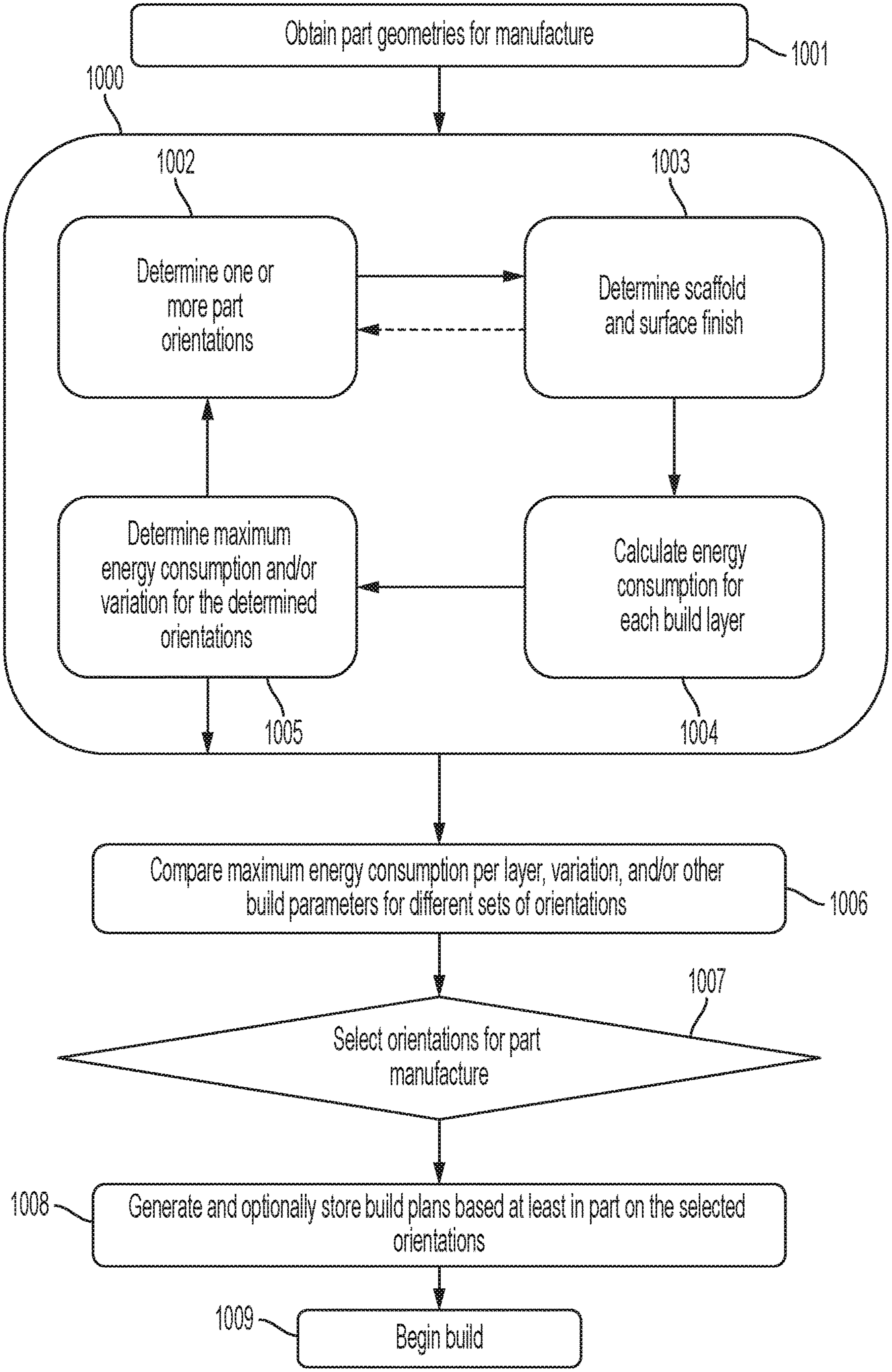
FIG. 10 shows a flow diagram of a second embodiment of a power balancing method for additive manufacturing.

FIG. 10 illustrates a flow diagram of one embodiment of a method for determining part orientations for helping reduce maximum combined power during operation during operation of a plurality of additive manufacturing systems. The steps illustrated do not represent the only possible way to determine an orientation of parts as other ways are contemplated.

Part geometries for manufacture in one or more build plans may be obtained at 1001. As the orientation for the parts has not yet been determined, layer slicing has not yet occurred. The geometries may be provided to an orientation module 1000. The orientation module may be run as a loop and may continue to be run multiple times to output a plurality of acceptable orientations. In some embodiments, the orientation module may place identical parts in an array with a single orientation. In other embodiments multiple orientations may be provided for identical parts. In some embodiments, the orientations of the parts may alternate in a predetermined pattern to identify configurations to reduce the variation in fused area between multiple layer slices. Multiple non-identical parts may also be oriented to reduce the variation in fused area between multiple layer slices. As described above, in some embodiments orientation of the parts may be selected to enable timing coordination, such as to produce orientations where one build plate may have a high power demand at a time when another build plate may have a lower power demand. In its simplest form, part orientations in step 1002 may be determined randomly. Subsequent steps may determine suitability and power needs for orientations determined at 1002. Step 1002 may correspond to any appropriate method for determining potential orientations for the plurality of parts. This may include selecting from potential predefined orientations of the parts, brute force permutations, Monte Carlo based methods, and/or any other appropriate method. Specific embodiments for determining orientations are described further in regard to FIG. 11.

Appropriate part orientation may be selected based at least partially on symmetry within one or more parts, surface finish requirements on one or more parts, part quality requirements of one or more parts, weld quality requirements for one or more parts, value of one or more parts, build time for one or more parts, thermal considerations for forming one or more parts, scaffolding construction, ease of removing one or more parts from at least one build plate, or other appropriate considerations.

After orientations of the plurality parts is determined, surface finish and scaffolding may be determined for the selected orientation in step 1003. Surface finish may be estimated from historical data from previous builds or from mathematical models or other techniques. Scaffolding may be determined from the part geometry, such as the amount of part overhang or the angle between a part surface and the build plate. If the orientation is found to be unacceptable due to finish or scaffolding, the orientation module will return to step 1002 to identify a new orientation. For brute force methods (i.e., "guess and check") this may mean rotating the first orientation by some predetermined amount or using any other method to identify a new orientation for one or more parts of the plurality of parts. For Monte Carlo methods this may mean a new randomly selected orientation different from the first orientation.

If the finish and scaffolding are found to be acceptable, the determined orientations of the parts may move to step 1004 to calculate energy requirements for each build layer. This may include determining a maximum energy consumption per build layer including the highest energy consumption layer along with other appropriate statistics including, for example, variability at step 1005. Energy consumption for a layer may be calculated from the solid fused area present in each build layer as well as from parameters such as laser power and scan rates for forming the layers. The maximum energy consumption per layer, variation, and/or other parameters may be determined for the current orientations of the one or more parts at 1006. This process of generating orientations and determining build parameters for comparison with other sets of orientations may continue until an appropriate end condition is met. For example, the orientation module may run until a certain number of candidate orientations are determined, until an end condition is met (e.g., a variation less than a threshold variation is identified, a maximum energy consumption per layer less than a threshold energy consumption per layer is identified, etc.), a certain quantity of time or computing power is expended, and/or any other appropriate end condition is met.

Once a plurality of potential orientations of the one or more parts are identified, the previously determined build parameters for the different sets of orientations may be compared at 1006. This may include build parameters such as maximum energy consumption per layer and/or variation (e.g., variability, standard deviation, or other measure of variability) of the energy consumption per layer for the plurality of layers. Other parameters may include surface finish, build time, and/or other parameters. In some embodiments, these or other parameters may be assigned weighted values depending on the importance of those parameters for a particular build. For example, selecting the orientations for the first part and the second part may be based at least in part on reducing the variation of energy consumption between layers of the at least one build plan during manufacture of the first part and the second part. For example, the orientations of the first part and the second part may be selected to align areas of reduced cross sectional area of the first part with areas of larger cross sectional area of the second part in a plurality of layers of the at least one build plan to reduce the variation of energy consumption between the layers as described above previously relative to FIGS. 8A-8C. In either case, based on the evaluation of any of the above parameters, a set of orientations for the one or more parts may be selected at 1007.

The selected orientation may then be used to generate one or more build plans in step 1008 depending on how many build plates the selected part orientations are associated with. In some embodiments, the one or more build plans may be stored in non-transitory computer readable memory for subsequent recall and use. These and other build plans disclosed herein may be generated using any appropriate build plan generating algorithm. These build plans may be or subsequently modified by during coordination of the operation of multiple additive manufacturing systems such as in the embodiment illustrated in FIG. 9.

Figure 11:
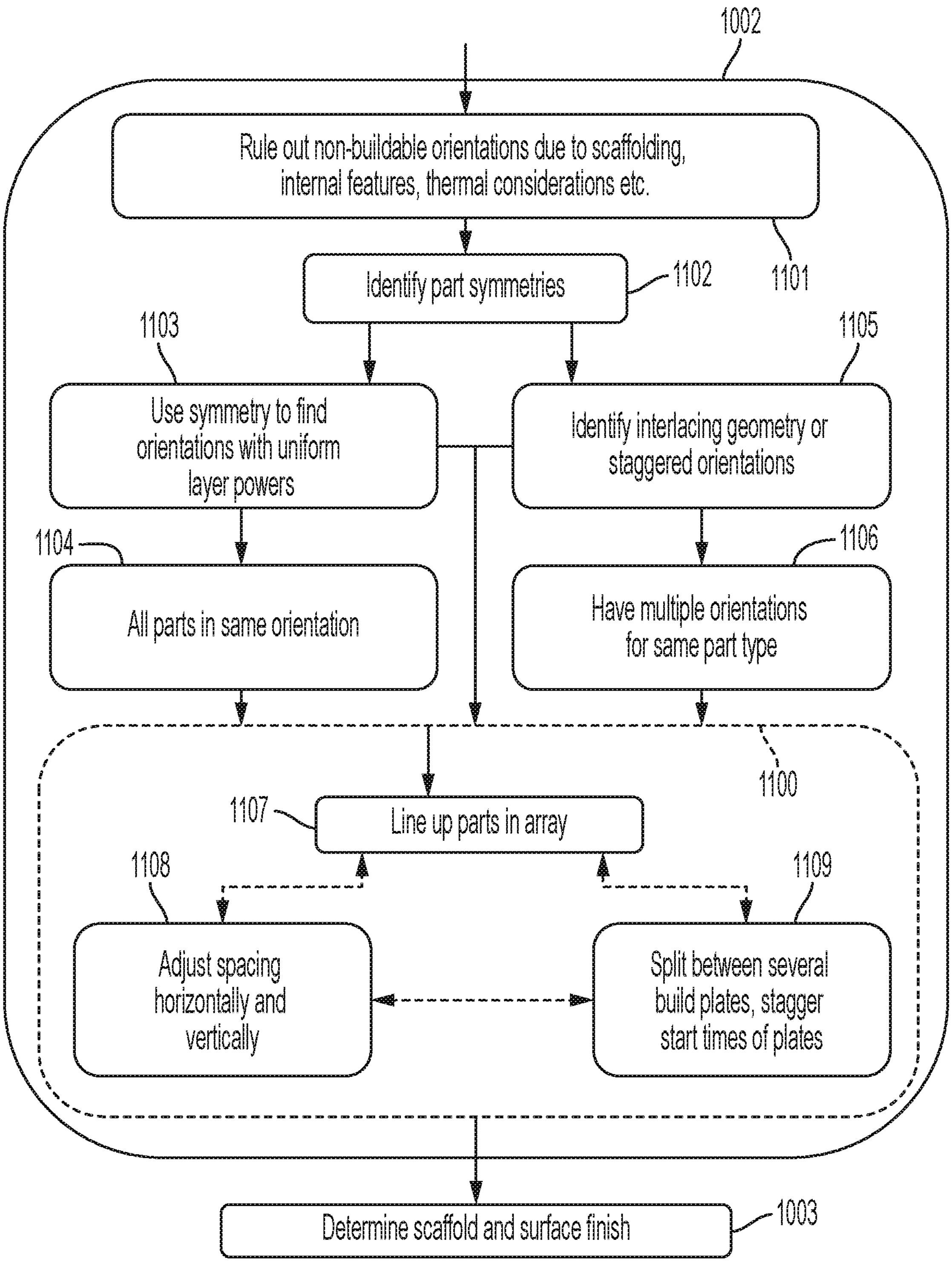
FIG. 11 shows a flow diagram of one embodiment of a method for determining part orientation for additive manufacturing.

FIG. 11 illustrates a flow diagram for identifying part orientations such as may occur within the orientation module in step 1002 of FIG. 10 according to some embodiments. The calculations described in FIG. 11 are intended to identify successful candidate orientations in a way that may be faster or more computationally economical than brute force methods. FIG. 11 shows a calculation for step 1002 of FIG. 10. Part geometries enter step 1002 as in FIG. 10.

Step 1101 may rule out unbuildable orientations. Unbuildable orientations may include orientations that cannot be built for any reason such as build plate area, vertical height of a part, scaffolding requirements, or other appropriate reasons. Some unbuildable orientations may be identified by dimensions (i.e., exceeding the build volume) other unbuildable orientations may be identified from historical data and/or other appropriate considerations. Step 1101 may also identify orientations that cannot be built to certain requirements, such as to a certain surface finish due to scaffolding, support points, or other manufacturing artifacts being present on part specific surfaces identified to have certain surface finish requirements.

At step 1102 part symmetries of the various different parts may be identified. For instance, identifying the centroid of a part such as to define a point through which planes of symmetric reflection, or other appropriate methods may be used to identify potential part symmetries to be evaluated. Objects such as parts may also exhibit partial symmetries, or symmetries that exist in a portion of the object but not in its entirety. Partial symmetries may be found by segmenting the object, such as a part, and then applying a technique such as would be used to detect a global symmetry on the individual segments. Approximate symmetry may additionally be considered. Part symmetry may be used to identify orientations that may use more uniform power during their construction, such as in step 1103, or to identify orientations that may be staggered or close packed in an efficient manner, such as in step 1105. For instance, if the parts to be manufactured are geometrically identical, selecting block 1103 for uniformity of power throughout the build may put all parts in the same orientation as in step 1104. If the parts to be manufactured are geometrically identical, step 1105 may interlace or close pack parts in multiple orientations for the same part geometry, step 1106.

Once orientations have been identified for each part in the build, parts move into a build plate placement module 1100.

Within the build plate placement module, parts may be lined up in an array 1107, split between build plates 1109, and/or the part spacing may be adjusted 1108. The spacing and placement of the parts on the build plates in the determined orientations may be based on manual input, predetermined minimum spacings, part size to build plate size relationships, and/or other appropriate considerations.

While several embodiments for identifying part orientations have been described other ways of selecting orientations are possible and this disclosure should not be so limiting. A controller may be configured to determine the part orientations based at least partially on one or more of the following, symmetry within one or more parts, surface finish requirements on one or more parts, part quality requirements of one or more parts, weld quality requirements for one or more parts, value of one or more parts, build time for one or more parts, thermal considerations for forming one or more parts, scaffolding considerations for forming one or more parts, scaffolding requirements based on the interaction of two or more parts, ease of removing one or more parts from at least one build plate, opportunities for coordination of system timing between multiple systems, and/or any other appropriate consideration.

Selecting part orientations and build plans to reduce a maximum energy consumption for a build layer during a build process may also help to reduce the likelihood of multiple additive manufacturing systems overlapping with each other during high power modes which may help to reduce maximum combined power for these systems. However, instances in which this method is combined with methods for coordinating system operation are also contemplated. For instance, in some cases, a group of simultaneously running additive manufacturing systems including a plurality of parts build plates that have been oriented using a method as disclosed above on a plurality of build plates of separate additive manufacturing systems. For instance, if parts have been appropriately laid out on multiple build plates the separate build plans may be coordinated to further reduce a maximum combined power during operation of the systems as previously discussed above.

The above described methods may be implemented by one or more controllers including at least one processor operatively coupled to the various controllable portions of additive manufacturing systems as disclosed herein. The methods may be embodied as computer readable instructions stored on non-transitory computer readable memory associated with the at least one processor such that when executed by the at least one processor the additive manufacturing system(s) may perform any of the actions related to the methods disclosed herein. Depending on the embodiments, these methods may also be implemented on a remotely located central controller, distributed controllers on the different additive manufacturing systems, combinations of the foregoing, and/or any other appropriate type of arrangement as the disclosure is not so limited. Additionally, it should be understood that the disclosed order of the steps is exemplary and that the disclosed steps may be performed in a different order, simultaneously, and/or may include one or more additional intermediate steps not shown as the disclosure is not so limited.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computing device or distributed among multiple computing devices. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computing device including one or more processors may be embodied in any of a number of forms, such as a rack-mounted computer, a desktop computer, a laptop computer, or a tablet computer. Additionally, a computing device may be embedded in a device not generally regarded as a computing device but with suitable processing capabilities, including a Personal Digital Assistant (PDA), a smart phone, tablet, or any other suitable portable or fixed electronic device.

Also, a computing device may have one or more input and output devices. These devices can be used, among other things, to present a user interface. Examples of output devices that can be used to provide a user interface include display screens for visual presentation of output and speakers or other sound generating devices for audible presentation of output. Examples of input devices that can be used for a user interface include keyboards, individual buttons, and pointing devices, such as mice, touch pads, and digitizing tablets. As another example, a computing device may receive input information through speech recognition or in other audible format.

Such computing devices may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the embodiments described herein may be embodied as a computer readable storage medium (or multiple computer readable media) (e.g., a computer memory, one or more floppy discs, compact discs (CD), optical discs, digital video disks (DVD), magnetic tapes, flash memories, RAM, ROM, EEPROM, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computing devices or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively or additionally, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computing device or other processor to implement various aspects of the present disclosure as discussed above. Additionally, it should be appreciated that according to one aspect of this embodiment, one or more computer programs that when executed perform methods of the present disclosure need not reside on a single computing device or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

The embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

The invention claimed is:

1. An additive manufacturing control system, comprising:
at least one controller including one or more processors, the at least one controller configured to:
obtain a plurality of build plans for building a plurality of parts with a plurality of additive manufacturing systems, wherein each additive manufacturing system of the plurality of additive manufacturing systems includes a plurality of energy sources configured to fuse at least a portion of layer of precursor material on a build surface of the additive manufacturing system;
adjust a timing and/or power of at least one build plan of the plurality of build plans to maintain a sum of power consumed by the plurality of additive manufacturing systems below a power limit; and
operate the plurality of additive manufacturing systems using the plurality of build plans to form the plurality of parts.

2. The additive manufacturing control system of claim 1, wherein the at least one controller is configured to vary the power limit while the plurality of additive manufacturing systems are operating.

3. The additive manufacturing control system of claim 1, wherein the power limit is lower than a sum of a maximum operating power of each additive manufacturing system of the plurality of additive manufacturing systems.

4. The additive manufacturing control system of claim 1, wherein the power limit is less than or equal to a power capacity of a power distribution system connected to the plurality of additive manufacturing systems.

5. The additive manufacturing control system of claim 1, wherein the at least one controller is configured to determine the power limit based at least partially on one or more power parameters.

6. The additive manufacturing control system of claim 5, wherein the one or more power parameters include at least one selected from: available power capacity and power cost.

7. The additive manufacturing control system of claim 1, wherein at least one of the at least one additive manufacturing systems is a powder bed fusion additive manufacturing system and the plurality of energy sources include a plurality of laser energy sources.

8. The additive manufacturing control system of claim 1, wherein the at least one controller is configured to control at least a first additive manufacturing system using a first build plan of the plurality of build plans and a second additive manufacturing system with a second build plan of the plurality of build plans, and wherein the at least one controller is configured to shift one or more periods of low power mode operation for the first build plan to at least partially overlap with one or more periods of high power mode operation of the second build plan to maintain the sum of power consumed by the plurality of additive manufacturing systems below the power limit.

9. The additive manufacturing control system of claim 8, wherein the at least one controller is configured to shift a timing of a first set of power peaks of the first build plan to at least partially overlap with a second set of power valleys of the second build plan to maintain the sum of power consumed by the plurality of additive manufacturing systems below the power limit.

10. The additive manufacturing control system of claim 1, wherein the at least one controller is configured to adjust the timing of the at least one build plan to maintain the sum of power consumed by the plurality of additive manufacturing systems below the power limit.

11. The additive manufacturing control system of claim 1, wherein the at least one controller is configured to adjust the power of the at least one build plan to maintain the sum of power consumed by the plurality of additive manufacturing systems below the power limit.

12. The additive manufacturing control system of claim 1, wherein the at least one controller is configured to prioritize parts for abandonment based on one or more part prioritization parameters.

13. The additive manufacturing control system of claim 12, wherein the one or more part prioritization parameters include at least one selected from: a part value; resources already expended on a part; and part quality.

14. The additive manufacturing control system of claim 12, wherein the at least one controller is configured to modify the plurality of build plans to abandon at least one part to maintain the sum of power consumed by the plurality of additive manufacturing systems below the power limit.

15. The additive manufacturing control system of claim 1, wherein at least one controller is configured to adjust the timing and/or power of the at least one build plan during manufacturing of the plurality of build plans to maintain the sum of power consumed by the plurality of additive manufacturing systems below the power limit.

16. A method for controlling power consumption of a plurality of additive manufacturing systems, the method comprising:

obtaining a plurality of build plans for building a plurality of parts with the plurality of additive manufacturing systems, wherein each additive manufacturing system of the plurality of additive manufacturing systems includes a plurality of energy sources which fuse at least a portion of layer of a precursor material on a build surface of the additive manufacturing system;

adjusting a timing and/or a power of at least one build plan of the plurality of build plans to maintain a sum of power consumed by the plurality of additive manufacturing systems below a power limit; and operating the plurality of additive manufacturing systems using the plurality of build plans to form the plurality of parts.

17. The method of claim 16, further comprising varying the power limit while the plurality of additive manufacturing systems are operating.

18. The method of claim 16, wherein the power limit is lower than a sum of a maximum operating power of each additive manufacturing system of the plurality of additive manufacturing systems.

19. The method of claim 16, wherein the power limit is less than or equal to a power capacity of a power distribution system connected to the plurality of additive manufacturing systems.

20. The method of claim 16, further comprising determining the power limit based at least partially on one or more power parameters.

21. The method of claim 20, wherein the one or more power parameters include at least one selected from: available power capacity and power cost.

22. The method of claim 16, wherein at least one of the at least one additive manufacturing systems is a powder bed fusion additive manufacturing system and the plurality of energy sources include a plurality of laser energy sources.

23. The method of claim 16, further comprising controlling at least a first additive manufacturing system using a first build plan of the plurality of build plans and a second additive manufacturing system with a second build plan of the plurality of build plans, and shifting one or more periods of low power mode operation for the first build plan to at least partially overlap with one or more periods of high power mode operation of the second build plan to maintain the sum of power consumed by the plurality of additive manufacturing systems below the power limit.

24. The method of claim 23, further comprising shifting a timing of a first set of power peaks of the first build plan to at least partially overlap with a second set of power valleys of the second build plan to maintain the sum of power consumed by the plurality of additive manufacturing systems below the power limit.

25. The method of claim 16, further comprising adjusting the timing of the at least one build plan to maintain the sum of power consumed by the plurality of additive manufacturing systems below the power limit.

26. The method of claim 16, further comprising adjusting the power of the at least one build plan to maintain the sum of power consumed by the plurality of additive manufacturing systems below the power limit.

27. The method of claim 16, further comprising prioritizing parts for abandonment based on one or more part prioritization parameters.

28. The method of claim 27, wherein the one or more part prioritization parameters include at least one selected from: a part value; resources already expended on a part; and part quality.

29. The method of claim 27, further comprising modifying the plurality of build plans to abandon at least one part to maintain the sum of power consumed by the plurality of additive manufacturing systems below the power limit.

30. The method of claim 16, further comprising adjusting the timing and/or power of the at least one build plan during manufacturing of the plurality of build plans to maintain the sum of power consumed by the plurality of additive manufacturing systems below the power limit.

* * * * *